(12) United States Patent
Xue et al.

(10) Patent No.: US 11,445,395 B2
(45) Date of Patent: Sep. 13, 2022

(54) MEASUREMENT METHOD AND DEVICE

(71) Applicant: HUAWEI TECHNOLOGIES CO., LTD., Guangdong (CN)

(72) Inventors: Jiantao Xue, Beijing (CN); Jing Han, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 85 days.

(21) Appl. No.: 16/674,852

(22) Filed: Nov. 5, 2019

(65) Prior Publication Data
US 2020/0068425 A1 Feb. 27, 2020

Related U.S. Application Data

(63) Continuation of application No. PCT/CN2017/083357, filed on May 5, 2017.

(51) Int. Cl.
*H04W 24/10* (2009.01)
*H04W 72/10* (2009.01)
*H04W 74/08* (2009.01)

(52) U.S. Cl.
CPC ........... *H04W 24/10* (2013.01); *H04W 72/10* (2013.01); *H04W 74/085* (2013.01)

(58) Field of Classification Search
None
See application file for complete search history.

(56) References Cited

U.S. PATENT DOCUMENTS

| 8,595,402 | B1 | 11/2013 | Erlich et al. |
| 2005/0022180 | A1 | 1/2005 | Couturier |
| 2006/0218271 | A1* | 9/2006 | Kasslin ............... H04L 43/06 709/224 |

(Continued)

FOREIGN PATENT DOCUMENTS

| CN | 101299866 A | 11/2008 |
| CN | 102695199 A | 9/2012 |

(Continued)

OTHER PUBLICATIONS

Office Action issued in Japanese Application No. 2019-560160 dated Jan. 26, 2021, 14 pages (with English translation).

(Continued)

*Primary Examiner* — Chi H Pham
*Assistant Examiner* — Raul Rivas
(74) *Attorney, Agent, or Firm* — Fish & Richardson P.C.

(57) ABSTRACT

This application discloses a measurement method and a device, to resolve the following problem: A collision occurs in a process of performing two measurement tasks by a terminal device, affecting measurement efficiency of the terminal device. In this method, after the terminal device simultaneously or successively receives measurement requests sent by devices initiating two measurement tasks, the terminal device may preferentially perform any one of the two measurement tasks, thereby ensuring completion quality of the measurement task. In this way, when devices initiating two measurement tasks instruct the terminal device to perform the two corresponding measurement tasks, a collision can be avoided in a process of performing the two measurement tasks by the terminal device, thereby ensuring measurement efficiency of the terminal device.

18 Claims, 8 Drawing Sheets

(56) References Cited

U.S. PATENT DOCUMENTS

| | | | |
|---|---|---|---|
| 2011/0045780 | A1 | 2/2011 | Ben Hadj Alaya et al. |
| 2012/0264449 | A1 | 10/2012 | Kazmi et al. |
| 2013/0303199 | A1 | 11/2013 | Siomina |
| 2014/0112180 | A1 | 4/2014 | Axmon et al. |
| 2014/0334325 | A1 | 11/2014 | Chandrasekhar et al. |
| 2015/0327286 | A1 | 11/2015 | Yiu et al. |
| 2016/0323822 | A1 | 11/2016 | Chapman et al. |
| 2018/0007516 | A1* | 1/2018 | Ge ........................... G01S 5/14 |
| 2018/0132124 | A1* | 5/2018 | Huang .............. H04W 36/0094 |

FOREIGN PATENT DOCUMENTS

| | | |
|---|---|---|
| CN | 103458446 A | 12/2013 |
| CN | 103458519 A | 12/2013 |
| CN | 103733723 A | 4/2014 |
| CN | 103763730 A | 4/2014 |
| CN | 104521273 A | 4/2015 |
| CN | 104521297 A | 4/2015 |
| CN | 105451331 A | 3/2016 |
| JP | 2016525679 A | 8/2016 |
| JP | 2016208538 A | 12/2016 |
| JP | 2017520958 A | 7/2017 |
| WO | 2012099514 A1 | 7/2012 |
| WO | 2012164853 A1 | 12/2012 |
| WO | 2012168090 A1 | 12/2012 |
| WO | 2012177203 A1 | 12/2012 |
| WO | 2015103733 A1 | 7/2015 |
| WO | 2015103803 A1 | 7/2015 |
| WO | 2015134471 A1 | 9/2015 |

OTHER PUBLICATIONS

ZTE, ZTE Microelectronics, "Consideration on the measurement coordination in LTE/NR tight interworking," 3GPP TSG RAN WG2 #97bis, R2-1702834, Spokane, UA, Apr. 3-7, 2017, 7 pages.

3GPP TS 36.355 V14.1.0 (Mar. 2017), "3rd Generation Partnership Project; Technical Specification Group Radio Access Network; Evolved Universal Terrestrial Radio Access (E-UTRA); LTE Positioning Protocol (LPP) (Release 14)," Mar. 2017, 164 pages.

3GPP TS 36.133 V14.3.0 (Mar. 2017), "3rd Generation Partnership Project; Technical Specification Group Radio Access Network; Evolved Universal Terrestrial Radio Access (E-UTRA); Requirements for support of radio resource management (Release 14)," Mar. 2017, 2387 pages.

3GPP TS 36.331 V14.2.2 (Apr. 2017), "3rd Generation Partnership Project; Technical Specification Group Radio Access Network; Evolved Universal Terrestrial Radio Access (E-UTRA); Radio Resouice Control (RRC); Protocol specification (Release 14)," Apr. 2017, 720 pages.

3GPP TS 36.211 V14.2.0 (Mar. 2017), 3rd Generation Partnership Project; Technical Specification Group Radio Access Network; Evolved Universal Terrestrial Radio Access (E-UTRA); Physical channels and modulation (Release 14), total 197 pages.

3GPP TS 36.214 V14.2.0 (Mar. 2017), "3rd Generation Partnership Project; Technical Specification Group Radio Access Network; Evolved Universal Terrestrial Radio Access (E-UTRA); Physical layer;Measurements (Release 14)," Mar. 2017, 22 pages.

Extended European Search Report issued in European Application No. 17908426.4 dated Jan. 7, 2020, 15 pages.

Huawei, HiSilicon, "Discussion on the RSRP measurement impact by Inter-frequency RSSI measurement in LAA," 3GPP TSG-RAN WG4 Meeting #82bis, R4-1703694, Spokane, US, Apr. 3-7, 2017, 2 pages.

Intel Corporation, "On measurement requirement for LAA," 3GPP TSG-RAN WG4 Meeting #82, R4-1700676, Athens, Greece, Feb. 13-17, 2017, 3 pages.

Office Action issued in Chinese Application No. 201780088982.6 dated Jun. 2, 2020, 23 pages (with English translation).

PCT International Search Report and Written Opinion issued in International Application No. PCT/CN2017/083357 dated Jan. 29, 2018, 17 pages (with English translation).

Intel, "NCSG configurations," 3GPP TSG RAN WG4 #82Bis, R4-1704117, Spokane, UAS, Apr. 3-7, 2017, 20 pages.

Office Action issued Japanese Application No. 2019-560160 dated Oct. 12, 2021, 6 pages (with English translation).

Office Action issued in Chinese Application No. 201780088982.6 dated Jan. 29, 2022, 6 pages.

Rapporteur, "Report on Location Service feature (LCS) 25.923 V1.0.0," 3GPP TSG-RAN Working Group 2 (Radio layer 2 and Radio layer 3), TSGR2#4 (99) 362, Berlin, Germany, May 25-28, 1999, 45 pages.

WG2, "Reporton Location Service feature (LCS) 25.923 V1.0.0," 3GPP TSG-RAN Meeting #4, TSGRP#4 RP-99(317), Miami, USA, Jun. 16-19, 1999, 45 pages.

Xiaorui et al., "Task Assignment Algorithm for Distributed Large Scale Network Measurement," Journal of Computer Applications, vol. 26, Dec. 2006, 4 pages (with English abstract).

* cited by examiner

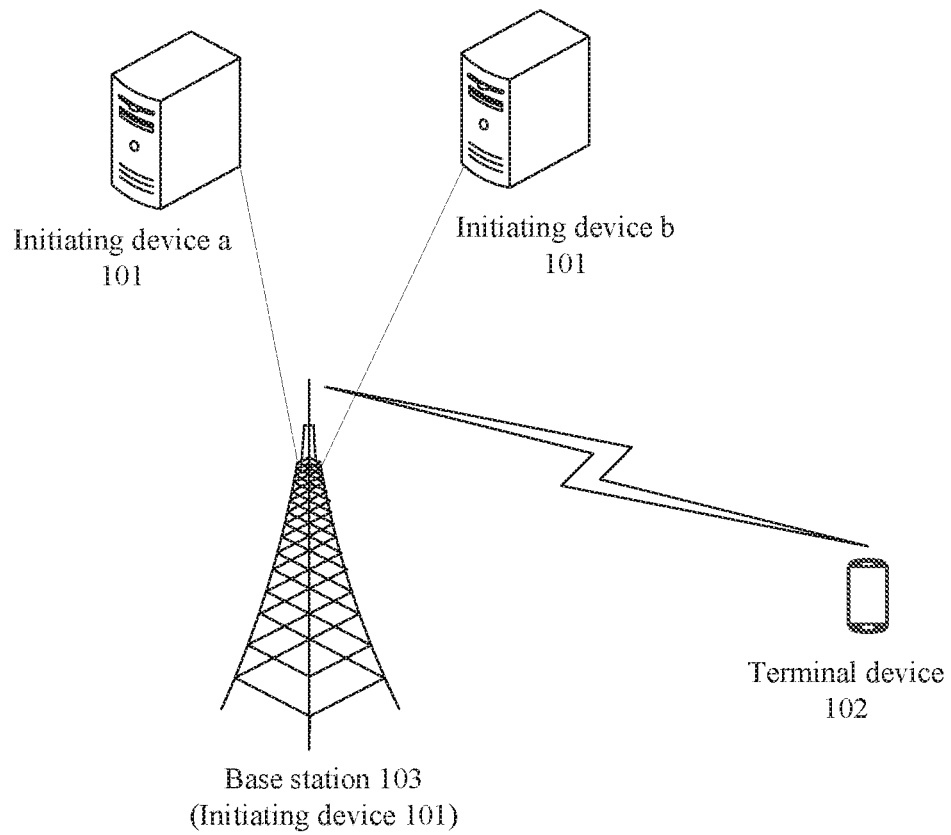

After a terminal device receives a first measurement request sent by a device initiating a first measurement task, when the terminal device does not finish performing the first measurement task, the terminal device receives a second measurement request sent by a device initiating a second measurement task; or the terminal device simultaneously receives the first measurement request and the second measurement request

S202

The terminal device preferentially performs a first target measurement task

FIG. 2

MEASUREMENT METHOD AND DEVICE

CROSS-REFERENCE TO RELATED APPLICATIONS

This application is a continuation of International Application No. PCT/CN2017/083357, filed on May 5, 2017, the disclosure of which is hereby incorporated by reference in its entirety.

TECHNICAL FIELD

This application relates to the field of communications technologies, and in particular, to a measurement method and a device.

BACKGROUND

Currently, a terminal device needs to perform a plurality of types of measurement tasks, including a positioning measurement task oriented to positioning and a non-positioning measurement task not oriented to positioning.

A procedure in which the terminal device performs the positioning measurement task includes the following: A device (for example, a positioning server) initiating the positioning measurement task sends a measurement request for the positioning measurement task to the terminal device, and the measurement request is used to instruct the terminal device to perform the positioning measurement task. After receiving the measurement request, the terminal device performs the positioning measurement task to obtain a measurement result, and sends the measurement result to the initiating device.

Similar to the procedure in which the terminal device performs the positioning measurement task, a procedure in which the terminal device performs the non-positioning measurement task includes the following: A device (for example, a base station) initiating the non-positioning measurement task sends a measurement request for the non-positioning measurement task to the terminal device, and the measurement request is used to instruct the terminal device to perform the non-positioning measurement task. After receiving the measurement request, the terminal device performs the non-positioning measurement task to obtain a measurement result, and sends the measurement result to the initiating device.

On the premise that the plurality of types of measurement tasks exist, a collision may occur when the terminal device simultaneously faces the plurality of types of measurement tasks, and consequently measurement efficiency is significantly reduced.

SUMMARY

Embodiments of this application provide a measurement method and a device, to resolve the following problem: A collision occurs in a process of performing two measurement tasks by a terminal device, affecting measurement efficiency of the terminal device.

According to a first aspect, an embodiment of this application provides a measurement method, and the method includes:

after a terminal device simultaneously or successively receives measurement requests sent by devices initiating two measurement tasks (for example, after the terminal device receives a first measurement request sent by a device initiating a first measurement task, when the terminal device does not finish performing the first measurement task, the terminal device receives a second measurement request sent by a device initiating a second measurement task; or the terminal device simultaneously receives the first measurement request and the second measurement request), preferentially performing, by the terminal device, a first target measurement task in the first measurement task and the second measurement task in the foregoing case.

According to the method, when devices initiating two measurement tasks instruct the terminal device to perform the two corresponding measurement tasks, a collision can be avoided in a process of performing the two measurement tasks by the terminal device, thereby ensuring measurement efficiency of the terminal device.

In a possible design, the terminal device may preferentially perform the first target measurement task in the following manners.

Manner 1: The terminal device performs the first target measurement task, and refuses to perform a second target measurement task.

Manner 2: The terminal device first performs the first target measurement task, and then performs the second target measurement task after finishing performing the first target measurement task.

Manner 3: The terminal device performs the first target measurement task in a specified execution time of the first target measurement task, prolongs a specified execution time of the second target measurement task, and performs the second target measurement task in a time obtained after the execution time of the second target measurement task is prolonged. An execution time of any measurement task is a consumed time from a moment when the terminal device starts to perform the measurement task to a moment when the terminal device finishes performing the measurement task.

Manner 4: The terminal device prolongs a specified execution time of the first target measurement task by first duration, prolongs a specified execution time of the second target measurement task by second duration, performs the first target measurement task in a time obtained after the execution time of the first target measurement task is prolonged, and performs the second target measurement task in a time obtained after the execution time of the second target measurement task is prolonged. The second duration is greater than the first duration.

Manner 5: The terminal device performs the first target measurement task by using a resource allocated to the first target measurement task, and performs the second target measurement task by using a resource allocated to the second target measurement task. The resource allocated to the first target measurement task is greater than the resource allocated to the second target measurement task, and the resource includes at least one of the following: a computing resource, a storage resource, a communication resource, and a measurement gap.

The second target measurement task is the other one, different from the first target measurement task, of the first measurement task and the second measurement task.

In Manner 1, completion quality of the first target measurement task can be ensured, so as to avoid a collision in a process of performing the two measurement tasks, thereby ensuring measurement efficiency of the terminal device.

In Manner 2, not only completion quality of the first target measurement task can be ensured, but also the second target measurement task can be completed, so as to avoid abandonment of a measurement task and a collision in a process of performing the two measurement tasks, thereby ensuring measurement efficiency of the terminal device.

In Manner 3, it can be ensured that the first target measurement task is finished in the execution time of the first target measurement task, thereby ensuring completion quality of the first target measurement task. In addition, the execution time of the second target measurement task is prolonged, so as to avoid a collision in a process of performing the two measurement tasks, thereby ensuring measurement efficiency of the terminal device.

In Manner 4, it can be ensured that the first target measurement task is finished when the execution time of the first target measurement task is prolonged by a shorter time, thereby ensuring completion quality of the first target measurement task. The execution time of the second target measurement task is prolonged by a longer time, so as to prevent the first target measurement task from being excessively avoided when the terminal device executes the second target measurement task, and avoid a collision in a process of performing the two measurement tasks, thereby ensuring measurement efficiency of the terminal device.

In Manner 5, because the resource allocated by the terminal device to the first target measurement task is greater than the resource allocated by the terminal device to the second target measurement task, the terminal device can ensure completion quality of the first target measurement task, so as to avoid a collision in a process of performing the two measurement tasks, thereby ensuring measurement efficiency of the terminal device.

In a possible design, before the terminal device preferentially performs the first target measurement task, the terminal device may further determine the first target measurement task. For example, the terminal device may determine the first target measurement task in the following manners.

Manner 1: When the terminal device determines that a time at which the first measurement request is received is earlier than a time at which the second measurement request is received, the terminal device determines the first measurement task as the first target measurement task.

Manner 2: When the terminal device determines that a time at which the second measurement request is received is later than a time at which the first measurement request is received, the terminal device determines the second measurement task as the first target measurement task.

Manner 3: The terminal device determines a priority of the first measurement task and a priority of the second measurement task, and determines a measurement task with a higher priority as the first target measurement task based on the priority of the first measurement task and the priority of the second measurement task.

Manner 4: The terminal device sends a first collision message to the device initiating the first measurement task, where the first collision message is used to indicate that the terminal device has received the second measurement request; receives a first measurement configuration message returned by the device initiating the first measurement task, where the first measurement configuration message is used to instruct the terminal device to preferentially perform the first target measurement task; and determines the first target measurement task based on the first measurement configuration message.

Manner 5: The terminal device sends a second collision message to the device initiating the second measurement task, where the second collision message is used to indicate that the terminal device has received the first measurement request; receives a second measurement configuration message returned by the device initiating the second measurement task, where the second measurement configuration message is used to instruct the terminal device to preferentially perform the first target measurement task; and determines the first target measurement task based on the second measurement configuration message.

Manner 6: The terminal device sends a third collision message to a base station serving the terminal device, where the third collision message is used to indicate that the terminal device has received the first measurement request and the second measurement request; receives a third measurement configuration message returned by the base station, where the third measurement configuration message is used to instruct the terminal device to preferentially perform the first target measurement task; and determines the first target measurement task based on the third measurement configuration message.

According to this design, the terminal device may flexibly select, according to a plurality of policies, a measurement task from the first measurement task and the second measurement task and preferentially perform the selected measurement task, thereby avoiding a collision in a process of performing the two measurement tasks.

In a possible design, when the first target measurement task is determined in Manner 4 in the foregoing design, the first collision message further includes the priority of the second measurement task, or the priority of the second measurement task and the priority of the first measurement task.

When the first collision message includes the priority of the second measurement task, the device initiating the first measurement task may obtain the priority of the second measurement task based on the first collision message. When the priority of the first measurement task is determined in another manner, a measurement task to be preferentially performed can be determined based on the priorities of the measurement tasks.

When the first collision message includes the priority of the second measurement task and the priority of the first measurement task, the device initiating the first measurement task may obtain the priority of the first measurement task and the priority of the second measurement task based on the first collision message, thereby determining, based on the priorities of the measurement tasks, a measurement task to be preferentially performed.

In a possible design, when the first target measurement task is determined in Manner 5 in the foregoing design, the second collision message further includes the priority of the first measurement task, or the priority of the first measurement task and the priority of the second measurement task.

According to this design, the device initiating the second measurement task may alternatively determine the priority of the first measurement task or the priorities of the two measurement tasks based on the second collision message, thereby determining, based on the priorities of the measurement tasks, a measurement task to be preferentially performed.

In a possible design, when the first target measurement task is determined in Manner 6 in the foregoing design, the third collision message further includes the priority of the first measurement task and the priority of the second measurement task.

According to this design, the base station may determine the priorities of the two measurement tasks, thereby determining, based on the priorities of the measurement tasks, a measurement task to be preferentially performed.

In a possible design, when the first target measurement task is determined in Manner 3 in the foregoing design, the terminal device may determine the priority of the first measurement task in the following implementations:

Implementation 1: The terminal device determines the priority that is of the first measurement task and that is included in the first measurement request.

Implementation 2: The terminal device sends a priority request to the device initiating the first measurement task, and receives a priority response that carries the priority of the first measurement task and that is returned by the device initiating the first measurement task.

Implementation 3: The terminal device may determine the priority of the first measurement task based on a correspondence between a measurement task and a priority.

According to this design, the terminal device can accurately determine the priority of the first measurement task.

In a possible design, when the first target measurement task is determined in Manner 3 in the foregoing design, the terminal device may determine the priority of the second measurement task in the following implementations:

Implementation 1: The terminal device determines the priority that is of the second measurement task and that is included in the second measurement request.

Implementation 2: The terminal device sends a priority request to the device initiating the second measurement task, and receives a priority response that carries the priority of the second measurement task and that is returned by the device initiating the second measurement task.

Implementation 3: The terminal device may determine the priority of the second measurement task based on a correspondence between a measurement task and a priority.

According to this design, the terminal device can accurately determine the priority of the second measurement task.

In a possible design, the performing, by the terminal device, the first target measurement task includes:

performing, by the terminal device, the first target measurement task in a first measurement gap.

According to this design, it can be ensured that the first target measurement task that needs to be performed in a measurement gap can be successfully completed.

In a possible design, the first measurement gap in the foregoing design is configured for the terminal device for the first measurement task by the device initiating the first measurement task or the base station serving the terminal device.

According to this design, when performing the first target measurement task, the terminal device may continue using a gap previously allocated to the first measurement task.

In a possible design, when the first target measurement task is the second measurement task, before the terminal device performs the first target measurement task in the first measurement gap, the terminal device configures a measurement gap for the second measurement task in the following steps:

first sending, for the second measurement task, a first measurement gap configuration request to the device initiating the second measurement task or the base station serving the terminal device; then receiving first measurement gap configuration information sent by the device initiating the second measurement task or the base station; and finally determining the first measurement gap based on the first measurement gap configuration information.

According to this design, the terminal device may request the device initiating the second measurement task or the base station to configure a measurement gap for the second measurement task.

In a possible design, the terminal device may perform the second target measurement task in the following implementations:

Implementation 1: The terminal device performs the second target measurement task in the first measurement gap.

Implementation 2: The terminal device performs the second target measurement task in a second measurement gap, and the second measurement gap is different from the first measurement gap.

According to this design, it can be ensured that the second target measurement task that needs to be performed in a measurement gap can be successfully completed.

In a possible design, before the terminal device performs the second target measurement task in the second measurement gap, the terminal device configures a measurement gap for the second target measurement task in the following steps:

first sending, for the second target measurement task, a second measurement gap configuration request to a device initiating the second target measurement task or the base station serving the terminal device: then receiving second measurement gap configuration information sent by the device initiating the second measurement task or the base station; and finally determining the second measurement gap based on the second measurement gap configuration information.

According to this design, the terminal device may request the device initiating the second target measurement task or the base station to configure a measurement gap for the second target measurement task.

In a possible design, when the terminal device preferentially performs the first target measurement task in Manner 1, the terminal device may further send a first measurement report reception indication to the device initiating the second target measurement task. The first measurement report reception indication is used to instruct the device initiating the second target measurement task to skip receiving a measurement report of the second target measurement task.

According to this design, the terminal device may notify the device initiating the second target measurement task that execution of the second target measurement task is prohibited. The initiating device skips, based on the first measurement report reception indication, receiving the measurement report of the second target measurement task. In addition, power consumed by the initiating device in waiting to receive the measurement report and in receiving the measurement report can be reduced.

In a possible design, when the terminal device preferentially performs the first target measurement task in Manner 2 or Manner 3, the terminal device may further send a second measurement report reception indication to the device initiating the second target measurement task. The second measurement report reception indication is used to instruct the device initiating the second target measurement task to prolong a time for receiving a measurement report of the second target measurement task.

According to this design, the terminal device may notify the device initiating the second target measurement task that execution of the second target measurement task is prolonged. The initiating device prolongs, based on the second measurement report reception indication, the time for receiving the measurement report of the second target measurement task. In addition, power consumed by the initiating device in waiting to receive the measurement report can be reduced.

In a possible design, when the terminal device preferentially performs the first target measurement task in Manner 4, the terminal device may further send a third measurement report reception indication to a device initiating the first target measurement task, and send a fourth measurement report reception indication to the device initiating the second target measurement task. The third measurement report reception indication is used to instruct the device initiating the first target measurement task to prolong a time for receiving a measurement report of the first target measurement task, and the fourth measurement report reception indication is used to instruct the device initiating the second target measurement task to prolong a time for receiving a measurement report of the second target measurement task.

According to this design, the terminal device may notify the devices initiating the two measurement tasks that execution of the measurement tasks respectively initiated by the initiating devices is prolonged. Each of the initiating devices prolongs, based on the received measurement report reception indication, the time for receiving the measurement report of the initiated measurement task. In addition, power consumed by the initiating device in waiting to receive the measurement report can be reduced.

In a possible design, the third measurement report reception indication further includes the first duration, and/or the fourth measurement report reception indication further includes the second duration.

According to this design, the device initiating the measurement task can learn, based on the received measurement report reception indication, a specific time by which the time for receiving the measurement report needs to be prolonged, thereby reducing power consumed by the initiating device in waiting to receive the measurement report.

In a possible design, the first measurement task and the second measurement task each are any one of a positioning measurement task and a non-positioning measurement task.

According to a second aspect, an embodiment of this application further provides a measurement method. The method includes:

determining, by an initiating device, a priority of a measurement task, and sending, by the initiating device, a measurement request for the measurement task to a terminal device, where the measurement request includes the priority of the measurement task.

According to the method, the initiating device adds the priority of the measurement task to the measurement request, and then sends the measurement request to the terminal device. In this way, the terminal device can determine the priority of the measurement task based on the measurement request, thereby determining, based on the priority of the measurement task, a measurement task to be preferentially performed.

According to a third aspect, an embodiment of this application further provides a measurement method. The method includes:

after sending a measurement request for a measurement task to a terminal device, receiving, by an initiating device, a priority request sent by the terminal device; and after determining a priority of the measurement task, sending, by the initiating device to the terminal device, a priority response carrying the priority of the measurement task.

According to the method, when the terminal device requests, from the initiating device, the priority of the measurement task initiated by the initiating device, the initiating device sends the priority of the measurement task to the terminal device. In this way, the terminal device can determine, based on the priority of the measurement task, a measurement task to be preferentially performed.

According to a fourth aspect, an embodiment of this application further provides a measurement method. The method includes:

sending, by an initiating device, a measurement request for a measurement task to a terminal device; after receiving a first measurement report reception indication sent by the terminal device, skipping, by the initiating device based on the first measurement report reception indication, receiving a measurement report of the measurement task; and after receiving a second measurement report reception indication sent by the terminal device, prolonging, by the initiating device based on the second measurement report reception indication, a specified time for receiving the measurement report of the measurement task, where the first measurement report reception indication is used to instruct the initiating device to skip receiving the measurement report of the measurement task, and the second measurement report reception indication is used to instruct the initiating device to prolong the time for receiving the measurement report of the measurement task.

According to the method, the initiating device can learn, based on the first measurement report reception indication, that the terminal device has refused to perform the measurement task and that reception of the measurement report of the measurement task is prohibited, so as to shorten a time in waiting to receive the measurement report and a time in receiving the measurement report. The initiating device can further learn, based on the second measurement report reception indication, that the terminal device has prolonged an execution time of the measurement task, that is, has prolonged a time in reporting the measurement report of the measurement task. Therefore, the initiating device can correspondingly prolong the specified time for receiving the measurement report of the measurement task, to shorten the time in waiting to receive the measurement report.

In a possible design, the second measurement report reception indication further includes duration. In this case, the initiating device may further prolong, based on the second measurement report reception indication in the following step, the specified time for receiving the measurement report of the measurement task:

prolonging, by the initiating device, the specified time for receiving the measurement report of the measurement task by the duration.

According to this design, the initiating device can determine specific duration by which the time for receiving the measurement report is to be prolonged, thereby reducing power consumed by the initiating device in waiting to receive the measurement report.

According to a fifth aspect, an embodiment of this application further provides a measurement method. The method includes:

sending, by an initiating device, a measurement request for a third measurement task to a terminal device; and after receiving a collision message sent by the terminal device, a device initiating a fourth measurement task, or a base station serving the terminal device, determining, by the initiating device, a first target measurement task, and sending a measurement configuration message to the terminal device, the device initiating the fourth measurement task, or the base station, where the measurement configuration message is used to instruct the terminal device to preferentially perform the first target measurement task, the collision message is used to indicate that the terminal device has received a measurement request for the fourth measurement task, and the first target measurement task is any one of the third measurement task and the fourth measurement task.

According to the method, the initiating device can instruct the terminal device to preferentially perform the first target measurement task. Therefore, the terminal device can preferentially perform any one of the two measurement tasks, thereby ensuring completion quality of the measurement task. In this way, when devices initiating two measurement tasks instruct the terminal device to perform the two corresponding measurement tasks, a collision can be avoided in a process of performing the two measurement tasks by the terminal device, thereby ensuring measurement efficiency of the terminal device.

In a possible design, the initiating device determines the first target measurement task in the following steps:

determining, by the initiating device, a priority of the third measurement task and a priority of the fourth measurement task; and then determining, by the initiating device, a measurement task with a higher priority as the first target measurement task based on the priority of the third measurement task and the priority of the fourth measurement task.

According to this design, the initiating device may select a measurement task with a higher priority from the third measurement task and the fourth measurement task and preferentially perform the selected measurement task, thereby avoiding a collision in a process of performing the two measurement tasks.

In a possible design, the initiating device may determine the priority of the third measurement task in the following implementations:

Implementation 1: The initiating device determines the stored priority of the third measurement task.

Implementation 2: The initiating device determines the priority that is of the third measurement task and that is included in the collision message.

According to this design, the initiating device can accurately determine the priority of the third measurement task.

In a possible design, the initiating device may determine the priority of the fourth measurement task in the following implementations:

Implementation 1: The initiating device determines the stored priority of the fourth measurement task.

Implementation 2: The initiating device determines the priority that is of the fourth measurement task and that is included in the collision message.

According to this design, the initiating device can accurately determine the priority of the fourth measurement task.

In a possible design, when the first target measurement task is the third measurement task, the initiating device receives a measurement report of the third measurement task in a specified time for receiving the measurement report of the third measurement task.

According to this design, when the initiating device determines that a measurement task to be preferentially performed is the third measurement task initiated by the initiating device, the initiating device may receive, in an original manner, the measurement report of the third measurement task in the specified time for receiving the measurement report of the third measurement task.

In a possible design, when the first target measurement task is the fourth measurement task, the initiating device skips receiving a measurement report of the third measurement task; or the initiating device prolongs a specified time for receiving a measurement report of the third measurement task.

According to this design, when the initiating device determines that a measurement task to be preferentially performed is not the third measurement task initiated by the initiating device, the initiating device may actively skip receiving the measurement report of the third measurement task or prolong the time for receiving the measurement report of the third measurement task, thereby reducing power consumed by the initiating device in waiting to receive the measurement report or in receiving the measurement report.

In a possible design, after the initiating device sends the measurement configuration message to the terminal device, the device initiating the fourth measurement task, or the base station, when the initiating device receives a first measurement report reception indication sent by the terminal device, the initiating device skips, based on the first measurement report reception indication, receiving a measurement report of the third measurement task; or when the initiating device receives a second measurement report reception indication sent by the terminal device, the initiating device prolongs, based on the second measurement report reception indication, a specified time for receiving a measurement report of the third measurement task. The first measurement report reception indication is used to instruct the initiating device to skip receiving the measurement report of the third measurement task, and the second measurement report reception indication is used to instruct the initiating device to prolong the time for receiving the measurement report of the third measurement task.

According to this design, the initiating device can learn an execution status of the third measurement task, and adjust the time for receiving the measurement report of the third measurement task in time or skip receiving the measurement report, thereby reducing power consumed in receiving the measurement report and in waiting to receive the measurement report.

In a possible design, when the second measurement report reception indication further includes duration, the initiating device may further prolong, based on the second measurement report reception indication in the following step, the specified time for receiving the measurement report of the third measurement task:

prolonging, by the initiating device, the specified time for receiving the measurement report of the third measurement task by the duration.

According to this design, the initiating device can determine specific duration by which the time for receiving the measurement report is to be prolonged, thereby reducing power consumed by the initiating device in waiting to receive the measurement report.

According to a sixth aspect, an embodiment of this application further provides a measurement method. The method includes:

receiving, by a base station serving a terminal device, a collision message sent by the terminal device, where the collision message is used to indicate that the terminal device has received a first measurement request for a first measurement task and a second measurement request for a second measurement task; and determining, by the base station, a first target measurement task from the first measurement task and the second measurement task, and sending, to the terminal device, a measurement configuration message for instructing the terminal device to preferentially perform the first target measurement task.

According to the method, the base station can instruct the terminal device to preferentially perform the first target measurement task. Therefore, the terminal device can preferentially perform any one of the two measurement tasks, thereby ensuring completion quality of the measurement task. In this way, when devices initiating two measurement tasks instruct the terminal device to perform the two corresponding measurement tasks, a collision can be avoided in a process of performing the two measurement tasks by the terminal device, thereby ensuring measurement efficiency of the terminal device.

In a possible design, the base station may determine the first target measurement task in the following method:

determining, by the base station, a priority of the first measurement task and a priority of the second measurement task; and then determining, by the base station, a measurement task with a higher priority as the first target measurement task based on the priority of the first measurement task and the priority of the second measurement task.

According to this design, the initiating device may select a measurement task with a higher priority from the first measurement task and the second measurement task and preferentially perform the selected measurement task, thereby avoiding a collision in a process of performing the two measurement tasks.

In a possible design, the base station may determine the priority of the first measurement task and the priority of the second measurement task in the following implementations:

Implementation 1: The base station determines the stored priority of the first measurement task and the stored priority of the second measurement task.

Implementation 2: The base station determines the priority of the first measurement task and the priority of the second measurement task that are included in the collision message.

According to this design, the base station can accurately determine the priorities of the first measurement task and the second measurement task.

According to a seventh aspect, an embodiment of this application further provides a measurement method, applied to a mobile communications system. In the method, after receiving a first measurement request sent by a device initiating a first measurement task, a terminal device sends a measurement task notification to another initiating device. The measurement task notification is used to notify the another initiating device that the terminal device has received the first measurement request, and the another initiating device is a device that can initiate a measurement task (that is, can send a measurement request to the terminal device) in the mobile communications system. In this way, after receiving the measurement task notification, the another initiating device no longer sends a measurement request to the terminal device in a specified time (preset duration, or a specified execution time of the first measurement task). The initiating device may be a base station or a server. For example, after the terminal device receives a measurement request sent by a base station for a non-positioning measurement task, the terminal device sends a measurement task notification to a server (for example, a positioning server). After receiving the measurement task notification, the server no longer sends a measurement request for a measurement task (for example, a measurement request for a positioning measurement task) in an execution time of the non-positioning measurement task.

According to the method, after receiving a measurement request, the terminal device sends a measurement task notification to another initiating device that may send a measurement request in the mobile communications system, so that the another initiating device no longer sends a measurement request to the terminal device in the specified time. In this way, a collision between a plurality of measurement tasks can be avoided in the terminal device, thereby ensuring measurement efficiency of the terminal device.

According to an eighth aspect, an embodiment of this application further provides a terminal device. The terminal device has functions of implementing behavior of the terminal device in the foregoing method embodiments. The functions may be implemented by hardware, or may be implemented by hardware executing corresponding software. The hardware or software includes one or more modules corresponding to the functions.

In a possible design, a structure of the terminal device includes a communications unit and a processing unit. These units can perform corresponding functions in the foregoing method embodiments. For details, refer to detailed descriptions in the method embodiments. Details are not described herein again.

In a possible design, a structure of the terminal device includes a transceiver, a processor, and a memory. The transceiver is configured to receive and send data, the processor is configured to support the terminal device in performing corresponding functions in the foregoing method, and the memory is coupled to the processor, and stores a program instruction (or an application program) and data that are necessary for the terminal device.

According to a ninth aspect, an embodiment of this application further provides an initiating device. The initiating device has functions of implementing behavior of the initiating device in the foregoing method embodiments. The functions may be implemented by hardware, or may be implemented by hardware executing corresponding software. The hardware or software includes one or more modules corresponding to the functions.

In a possible design, a structure of the initiating device includes a communications unit and a processing unit. These units can perform corresponding functions in the foregoing method embodiments. For details, refer to detailed descriptions in the method embodiments. Details are not described herein again.

In a possible design, a structure of the initiating device includes a communications module, a processor, and a memory. The communications module is configured to receive and send data, the processor is configured to support the initiating device in performing corresponding functions in the foregoing method, and the memory is coupled to the processor, and stores a program instruction (or an application program) and data that are necessary for the initiating device.

According to a tenth aspect, an embodiment of this application further provides a base station. The base station has functions of implementing behavior of the base station in the foregoing method embodiments. The functions may be implemented by hardware, or may be implemented by hardware executing corresponding software. The hardware or software includes one or more modules corresponding to the functions.

In a possible design, a structure of the base station includes a communications unit and a processing unit. These units can perform corresponding functions in the foregoing method embodiments. For details, refer to detailed descriptions in the method embodiments. Details are not described herein again.

In a possible design, a structure of the base station includes a transceiver, a processor, and a memory. The transceiver is configured to receive and send data, the processor is configured to support the base station in performing corresponding functions in the foregoing method, and the memory is coupled to the processor, and stores a program instruction (or an application program) and data that are necessary for the base station.

According to an eleventh aspect, an embodiment of this application further provides a computer storage medium. The storage medium stores a software program, and when the software program is read and executed by one or more processors, the method according to any one of the first to the sixth aspects or any design of any of the aspects can be implemented.

According to a twelfth aspect, an embodiment of this application further provides a computer program product including an instruction. When the instruction runs on a computer, the computer is enabled to perform the method described in each of the foregoing aspects.

In the embodiments of this application, after the terminal device simultaneously or successively receives measurement requests sent by devices initiating two measurement tasks, the terminal device may preferentially perform any one of the two measurement tasks, thereby ensuring completion quality of the measurement task. In this way, when devices initiating two measurement tasks instruct the terminal device to perform the two corresponding measurement tasks, a collision can be avoided in a process of performing the two measurement tasks by the terminal device, thereby ensuring measurement efficiency of the terminal device.

BRIEF DESCRIPTION OF DRAWINGS

FIG. 1 is an architectural diagram of a mobile communications system according to an embodiment of this application:

FIG. 2 is a flowchart of a first measurement method according to an embodiment of this application;

DESCRIPTION OF EMBODIMENTS

Figure 3:
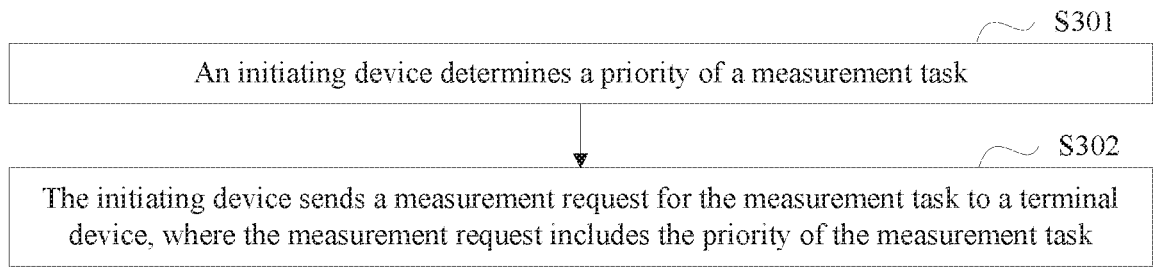
FIG. 3 is a flowchart of a second measurement method according to an embodiment of this application.

This application provides a measurement method and a device, to resolve the following problem: A collision occurs in a process of performing two measurement tasks by a terminal device, affecting measurement efficiency of the terminal device. The method and the device are based on a same invention idea. The method and the device have a similar principle for resolving a problem. Therefore, for implementation of the device and implementation of the method, refer to each other. Repeated parts are not described again.

Based on the description in the foregoing background, because a chip in a terminal device has a limited processing capability, the terminal device cannot simultaneously perform the two measurement tasks. Therefore, when the devices initiating the two measurement tasks both instruct the terminal device to perform the two corresponding measurement tasks, for example, when the terminal device simultaneously receives measurement requests for the two measurement tasks, or when the terminal device receives, in a process of performing one of the two measurement tasks, a measurement request for the other measurement task, a collision occurs when the terminal device performs the two measurement tasks, affecting measurement efficiency of the terminal device.

In the embodiments of this application, after the terminal device simultaneously or successively receives measurement requests sent by devices initiating two measurement tasks, the terminal device may preferentially perform any one of the two measurement tasks, thereby ensuring completion quality of the measurement task. In this way, when devices initiating two measurement tasks instruct the terminal device to perform the two corresponding measurement tasks, a collision can be avoided in a process of performing the two measurement tasks by the terminal device, thereby ensuring measurement efficiency of the terminal device.

Some terms in this application are described below to help a person skilled in the art have a better understanding.

(1) A base station in the embodiments of this application is a device for connecting a terminal device to a radio network, and includes but is not limited to an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), an access point (AP), or the like.

(2) A terminal device in this application, also referred to as user equipment (UE), is a device for providing a user with voice and/or data connectivity, for example, a handheld device, an in-vehicle device, a wearable device, or a computing device each having a wireless connection function, or a mobile station (MS), another processing device connected to a wireless modem, or the like.

(3) A measurement task in this application is a measurement operation or behavior that needs to be performed by a terminal device, to achieve a particular measurement objective to obtain data required by a user. Based on division of objectives of measurement tasks, the measurement tasks may be classified into a positioning measurement task and a non-positioning measurement task.

The positioning measurement task is a measurement task through which the terminal device measures some related parameters that can be used to calculate a physical location of the terminal device, to position the terminal device. For example, the related parameters may be but are not limited to at least one of the following: a signal reception time difference, a signal transmission time difference, a reference signal arrival time difference (RSTD), and the like of the terminal device.

The non-positioning measurement task is a measurement task through which the terminal device measures a related parameter that can be used to implement an objective different from an objective of positioning the terminal device, to achieve the objective different from the objective of positioning the terminal device. For example, the related parameter may be but is not limited to at least one of the following: reference signal received power (RSRP), a reference signal-signal to interference plus noise ratio (RS-SINR), and the like of the terminal device.

(4) An execution time of a measurement task in this application is a consumed time from a moment when a terminal device starts to perform the measurement task to a moment when the terminal device finishes performing the measurement task (for example, generating a measurement report or reporting a measurement report). The execution time may alternatively be represented by a measurement time of the measurement task. For example, the measurement time is defined in the specification TS36.133 of the 3rd generation partnership project (3GPP) as follows: the measurement time starts from a time at which the terminal device receives a measurement request (or a measurement instruction) to a time at which the terminal device reports a measurement report.

Execution time of some measurement tasks may be specified, for example, specified in a protocol, or may be specified by devices initiating the measurement tasks and notified to the terminal device, or may be specified by a base station serving the terminal device and notified to the terminal device.

(5) A computing resource in this application is a resource that is of a terminal device and that is used to implement computing required by a measurement task, for example, utilization of a central processing unit (CPU), or utilization of digital signal processor (DSP).

(6) A storage resource in this application is a resource required by a terminal device for storing data and a program that are related to a measurement task, and may include a cache, memory, and the like.

(7) A communication resource in this application includes a time-frequency resource, an antenna, and the like allocated to a terminal device for transmitting data, in a measurement task, that needs to be transmitted.

(8) A measurement gap in this application is set by a device initiating a measurement task or a base station for a terminal device to perform a measurement task. The terminal device performs the measurement task in the measurement gap, to reduce measurement overheads of the terminal device. Usually, a manner of configuring the measurement gap is configuring a 6 ms measurement gap in a 40 ms or 80 ms measurement gap repetition period (MGRP).

It should be noted that not all measurement tasks need to be performed in the measurement gap, and measurement gaps may not need to be configured for some measurement tasks. This is not limited in this application.

(9) An initiating device in this application is a device initiating a measurement task, that is, a device sending a measurement request. Currently, the positioning measurement task is usually initiated by a positioning server, and a non-positioning measurement task is usually initiated by a base station. Therefore, optionally, the initiating device may be but is not limited to a base station or a server, and may alternatively be another subsequent device that can initiate a measurement task.

"A plurality of" means two or more than two.

In addition, it should be understood that in the descriptions of this application, words "first", "second", and the like are merely used for distinguished description, and shall not be understood as an indication or implication of relative importance or an indication or implication of an order.

The embodiments of this application are further described in detail with reference to accompanying drawings.

FIG. 1 shows a possible architecture of a mobile communications system to which a measurement method according to an embodiment of this application is applicable. As shown in FIG. 1, the mobile communications system includes at least one initiating device 101 (for example, an initiating device a101 and an initiating device b101 shown in the figure), a terminal device 102, and a base station 103.

The initiating device 101 is configured to send a measurement request for a measurement task to the terminal device 102, to instruct the terminal device 102 to perform the measurement task.

After receiving the measurement request from the initiating device, the terminal device 102 performs the corresponding measurement task, and reports a measurement report to the initiating device 101 when finishing performing the measurement task, to notify the initiating device 101 of a result of the measurement task.

The base station 103 may be used as the initiating device 101 to send a measurement request for a measurement task to the terminal device 102, or may be used as a communications node between another initiating device 101 and the terminal device 102. For example, when sending a measurement request to the terminal device 102, the initiating device a101 needs to first send the measurement request to the base station 103, and then the base station 103 forwards the measurement request to the terminal device 102.

It should be noted that the mobile communications system shown in FIG. 1 is applicable to a long term evolution (LTE) system, a communications system evolved based on the LTE system, an Internet of things system, and the like.

It may be understood that the architecture of the mobile communications system described in this embodiment of the present invention is an example used to describe the technical solutions in the embodiments of this application more clearly, and constitute no limitation on the technical solutions provided in the embodiments of this application. A person of ordinary skill in the art may learn that with evolution of the architecture of the mobile communications system and emergence of a new service, the technical solutions provided in the embodiments of this application are also applicable to similar technical problems.

An embodiment of this application provides a measurement method. The method is applicable but is not applicable to only the mobile communications system shown in FIG. 1. As shown in FIG. 2, a procedure of the method includes the following steps.

S201. After a terminal device receives a first measurement request sent by a device initiating a first measurement task, when the terminal device does not finish performing the first measurement task, the terminal device receives a second measurement request sent by a device initiating a second measurement task; or the terminal device simultaneously receives the first measurement request and the second measurement request.

The first measurement request is used to instruct the terminal device to perform the first measurement task, and the second measurement request is used to instruct the terminal device to perform the second measurement task.

Optionally, that the terminal device does not finish performing the first measurement task includes two cases: The terminal device has not started to perform the first measurement task; or the terminal device is performing the first measurement task.

In S201, the first measurement task and the second measurement task each are any one of a positioning measurement task and a non-positioning measurement task. Optionally, the first measurement task and the second measurement task may both be positioning measurement tasks, or may both be non-positioning measurement tasks, or may be measurement tasks of different types. This is not limited in this embodiment of this application.

A representation manner of a measurement request for any measurement task may vary with the measurement task. For example, when a measurement request is a positioning measurement request, the measurement request may be request location information.

Optionally, the initiating device may be a base station or a server.

In addition, it should be noted that the device initiating the first measurement task and the device initiating the second measurement task may be a same device or different devices. This is not limited in this embodiment of this application.

It can be learned from S201 that the terminal device simultaneously or successively receives the two measurement tasks. Therefore, a collision may occur in a process of performing the two measurement tasks. The mobile communications system shown in FIG. 1 is used as an example below for description. In Example 1, the terminal device 102 first receives a measurement request a sent by the initiating device a101 initiating a measurement task a; and when the terminal device 102 has not started to perform the measurement task a or when the terminal device 102 is performing the measurement task a, receives a measurement request 2 sent by the initiating device b101 initiating a measurement task b.

To avoid a collision in a process of performing the two measurement tasks, the terminal device may select a measurement task from the first measurement task and the second measurement task and preferentially perform the selected measurement task. Optionally, before performing a subsequent step S202, the terminal device determines a first target measurement task, and the first target measurement task is any one of the first measurement task and the second measurement task.

The terminal device may determine the first target measurement task in any one of the following manners.

Manner 1: When the terminal device determines that a time at which the first measurement request is received is earlier than a time at which the second measurement request is received, the terminal device determines the first measurement task as the first target measurement task. For example, in Example 1, the terminal device 102 may select the measurement task a as the first target measurement task.

Manner 2: When the terminal device determines that a time at which the second measurement request is received is later than a time at which the first measurement request is received, the terminal device determines the second measurement task as the first target measurement task. For example, in Example 1, the terminal device 102 may select the measurement task b as the first target measurement task.

Manner 3: The terminal device determines a priority of the first measurement task and a priority of the second measurement task, and determines a measurement task with a higher priority as the first target measurement task based on the priority of the first measurement task and the priority of the second measurement task. For example, in Example 1, the terminal device 102 determines that a priority of the measurement task a is higher and a priority of the measurement task b is lower, and the terminal device 102 may select the measurement task a as the first target measurement task.

It can be learned from the descriptions of Manner 1, Manner 2, and Manner 3 that the terminal device may determine, according to various policies, a measurement task to be preferentially performed.

Manner 4: The terminal device sends a first collision message to the device initiating the first measurement task. The first collision message is used to indicate that the terminal device has received the second measurement request.

The device initiating the first measurement task may determine the first target measurement task; or may forward the first collision message to the device initiating the second measurement task or a base station, so that the device initiating the second measurement task or the base station determines the first target measurement task, and notifies the device initiating the first measurement task of the first target measurement task.

After determining the first target measurement task, the device initiating the first measurement task returns a first measurement configuration message to the terminal device. The first measurement configuration message is used to instruct the terminal device to preferentially perform the first target measurement task.

The terminal device receives the first measurement configuration message returned by the device initiating the first measurement task, and determines the first target measurement task based on the first measurement configuration message.

Manner 5: Similar to the process in Manner 4, the terminal device sends a second collision message to the device initiating the second measurement task. The second collision message is used to indicate that the terminal device has received the first measurement request.

The device initiating the second measurement task may determine the first target measurement task; or may forward the second collision message to the device initiating the first measurement task or a base station, so that the device initiating the first measurement task or the base station determines the first target measurement task, and notifies the device initiating the second measurement task of the first target measurement task.

After determining the first target measurement task, the device initiating the second measurement task returns a second measurement configuration message to the terminal device. The second measurement configuration message is used to instruct the terminal device to preferentially perform the first target measurement task.

The terminal device receives the second measurement configuration message returned by the device initiating the second measurement task, and determines the first target measurement task based on the second measurement configuration message.

It can be learned from the descriptions of Manner 4 and Manner 5 that the terminal device may determine, by using the devices initiating the measurement tasks, a measurement task to be preferentially performed.

Manner 6: When neither the device initiating the first measurement task nor the device initiating the second measurement task is a base station, the terminal device sends a third collision message to a base station serving the terminal device. The third collision message is used to indicate that the terminal device has received the first measurement request and the second measurement request.

The base station determines the first target measurement task, and returns a third measurement configuration message to the terminal device. The third measurement configuration message is used to instruct the terminal device to preferentially perform the first target measurement task.

The terminal device receives the third measurement configuration message returned by the base station, and determines the first target measurement task based on the third measurement configuration message.

It can be learned from the description of Manner 6 that the terminal device may alternatively determine, by using the base station, a measurement task to be preferentially performed.

It should be noted that the six manners constitute no limitation on determining the first target measurement task by the terminal device. The terminal device may alternatively determine the first target measurement task according to another policy, for example, randomly select one measurement task from the first measurement task and the second measurement task, or select a measurement task whose execution time is shorter from the first measurement task and the second measurement task.

Optionally, in Manner 3 of determining the first target measurement task, the terminal device may determine the priority of the first measurement task in the following implementations:

Implementation 1: When sending the first measurement request, the device initiating the first measurement task may add the priority of the first measurement task to the first measurement request. In this way, the terminal device can determine the priority, of the first measurement task, included in the first measurement request.

Implementation 2: The terminal device sends a priority request to the device initiating the first measurement task. After determining a priority of the first measurement task, the device initiating the first measurement task sends, to the terminal device, a priority response carrying the priority of the first measurement task. The terminal device receives the priority response that carries the priority of the first measurement task and that is returned by the device initiating the first measurement task.

Implementation 3: The terminal device may determine the priority of the first measurement task based on a correspondence between a measurement task and a priority.

Optionally, in Manner 3 of determining the first target measurement task, the terminal device may alternatively determine the priority of the second measurement task in the following several implementations. A method for determining the priority of the second measurement task by the terminal device is the same as a method for determining the priority of the first measurement task by the terminal device. Therefore, for same parts, refer to the foregoing descriptions for determining the priority of the first measurement task. Details are not described herein again.

Implementation 1: The terminal device determines the priority that is of the second measurement task and that is included in the second measurement request.

Implementation 2: The terminal device sends a priority request to the device initiating the second measurement task, and receives a priority response that carries the priority of the second measurement task and that is returned by the device initiating the second measurement task.

Implementation 3: The terminal device may determine the priority of the second measurement task based on a correspondence between a measurement task and a priority.

Optionally, in Manner 4 of determining the first target measurement task, when determining the priority of the second measurement task, the terminal device may add the priority of the second measurement task to the first collision message. In this way, the device initiating the first measurement task can obtain the priority of the second measurement task based on the first collision message. When the priority of the first measurement task is determined in another manner, a measurement task to be preferentially performed can be determined based on the priorities of the measurement tasks.

Optionally, in Manner 4 of determining the first target measurement task, when determining the priority of the first measurement task and the priority of the second measurement task, the terminal device may add both the priority of the first measurement task and the priority of the second measurement task to the first collision message. In this way, the device initiating the first measurement task can obtain the priority of the first measurement task and the priority of the second measurement task based on the first collision message, so that a measurement task to be preferentially performed can be determined based on the priorities of the measurement tasks.

Optionally, similar to Manner 4 of determining the first target measurement task, in Manner 5 of determining the first target measurement task, the second collision message may further include the priority of the first measurement task, or the priority of the first measurement task and the priority of the second measurement task.

In this way, the device initiating the second measurement task may alternatively determine the priority of the first measurement task or the priorities of the two measurement tasks based on the second collision message, thereby determining, based on the priorities of the measurement tasks, a measurement task to be preferentially performed.

Optionally, similar to Manner 4 of determining the first target measurement task, in Manner 6 of determining the first target measurement task, the third collision message may further include the priority of the first measurement task and the priority of the second measurement task.

In this way, the base station can determine the priorities of the two measurement tasks, thereby determining, based on the priorities of the measurement tasks, a measurement task to be preferentially performed.

S202. The terminal device preferentially performs the first target measurement task.

In S202, the terminal device can ensure completion quality of the first target measurement task, so as to avoid a collision in a process of performing the two measurement tasks, thereby ensuring measurement efficiency of the terminal device.

Optionally, the terminal device may perform S202 in but not in only the following manners. The second target measurement task is the other one, different from the first target measurement task, of the first measurement task and the second measurement task.

Manner 1: The terminal device performs the first target measurement task, and refuses to perform a second target measurement task.

For example, in a scenario in which the terminal device has not started to perform the first measurement task, that the terminal device refuses to perform a second target measurement task includes the following: the terminal device no longer performs the second target measurement task.

For another example, in a scenario in which the terminal device is performing the first measurement task, and the second target measurement task is the first measurement task, that the terminal device refuses to perform a second target measurement task includes:

the terminal device suspends execution of the first measurement task, and no longer performs the first measurement task.

Therefore, in the manner, completion quality of the first target measurement task can be ensured, so as to avoid a collision in a process of performing the two measurement tasks, thereby ensuring measurement efficiency of the terminal device.

Manner 2: The terminal device first performs the first target measurement task, and then performs the second target measurement task after finishing performing the first target measurement task.

Therefore, in the manner, not only completion quality of the first target measurement task can be ensured, but also the second target measurement task can be completed, so as to avoid abandonment of a measurement task and a collision in a process of performing the two measurement tasks, thereby ensuring measurement efficiency of the terminal device.

Manner 3: The terminal device performs the first target measurement task in a specified execution time of the first target measurement task, prolongs a specified execution time of the second target measurement task, and performs the second target measurement task in a time obtained after the execution time of the second target measurement task is prolonged. An execution time of any measurement task is a consumed time from a moment when the terminal device starts to perform the measurement task to a moment when the terminal device finishes performing the measurement task.

Therefore, in the manner, it can be ensured that the first target measurement task is finished in the execution time of the first target measurement task, thereby ensuring completion quality of the first target measurement task. In addition, the execution time of the second target measurement task is prolonged, so as to avoid a collision in a process of performing the two measurement tasks, thereby ensuring measurement efficiency of the terminal device.

Manner 4: The terminal device prolongs a specified execution time of the first target measurement task by first duration, prolongs a specified execution time of the second target measurement task by second duration, performs the first target measurement task in a time obtained after the execution time of the first target measurement task is prolonged, and performs the second target measurement task in a time obtained after the execution time of the second target measurement task is prolonged. The second duration is greater than the first duration.

Therefore, in the manner, it can be ensured that the first target measurement task is finished when the execution time of the first target measurement task is prolonged by a shorter time, thereby ensuring completion quality of the first target measurement task. In addition, the execution time of the second target measurement task is prolonged by a longer time, so as to prevent the first target measurement task from being excessively avoided when the terminal device performs the second target measurement task, and avoid a collision in a process of performing the two measurement tasks, thereby ensuring measurement efficiency of the terminal device.

Manner 5: The terminal device performs the first target measurement task by using a resource allocated to the first target measurement task, and performs the second target measurement task by using a resource allocated to the second target measurement task. The resource allocated to the first target measurement task is greater than the resource allocated to the second target measurement task, and the resource includes at least one of the following: a computing resource, a storage resource, a communication resource, and a measurement gap.

For example, there are ten measurement gaps in a specified period, and the terminal device may perform the first target measurement task in eight measurement gaps, and perform the second target measurement task in the other two measurement gaps.

In the manner, because the resource allocated by the terminal device to the first target measurement task is greater than the resource allocated by the terminal device to the second target measurement task, the terminal device can ensure completion quality of the first target measurement task, so as to avoid a collision in a process of performing the two measurement tasks, thereby ensuring measurement efficiency of the terminal device.

In Manner 3 to Manner 5, there may be a partial intersection between the execution time of the first target measurement task and the execution time of the second target measurement task. In this intersection, a resource allocated by the terminal device to the first target measurement task is greater than a resource allocated by the terminal device to the second target measurement task, to ensure completion quality of the first target measurement task.

According to the measurement method provided in this embodiment of this application, after the terminal device simultaneously or successively receives measurement requests sent by devices initiating two measurement tasks, the terminal device may preferentially perform any one of the two measurement tasks, thereby ensuring completion quality of the measurement task. In this way, when devices initiating two measurement tasks instruct the terminal device to perform the two corresponding measurement tasks, a collision can be avoided in a process of performing the two measurement tasks by the terminal device, thereby ensuring measurement efficiency of the terminal device.

It should be noted that in the measurement method, the terminal device may preferentially perform the first target measurement task in the foregoing manners, to ensure completion quality of the first target measurement task. Optionally, in S201, to ensure that both the two measurement tasks can be performed, the terminal device may not preferentially perform one of the measurement tasks.

For example, the terminal device prolongs the specified execution time of the first measurement task, prolongs the specified execution time of the second measurement task, performs the first measurement task in a time obtained after the execution time of the first measurement task is prolonged, and performs the second measurement task in a time obtained after the execution time of the second measurement task is prolonged. The terminal device may not specify, duration by which the execution times of the two measurement tasks are to be prolonged or may specify same duration by which the execution times of the two measurement tasks are to be prolonged.

For another example, the terminal device allocates a same resource to the first measurement task and the second measurement task, so that the terminal device performs the two measurement tasks by using the same resource.

In addition, it can be learned from the foregoing description of a measurement gap that some measurement tasks need to be performed in a measurement gap. Therefore, optionally, in S202 in the foregoing embodiment, the terminal device may perform the first target measurement task in the following implementations, including:

performing, by the terminal device, the first target measurement task in a first measurement gap.

Optionally, in a scenario in which the first measurement task needs to be performed in a measurement gap, and the device initiating the first measurement task or the base station has configured a measurement gap for the first measurement task, the configured measurement gap may still be used for the first target measurement task, regardless of whether the first target measurement task is the first measurement task or the second measurement task.

Optionally, when the first measurement task is the first measurement task and the device initiating the first measurement task or the base station does not configure a measurement gap for the first measurement task, the terminal device needs to request the device initiating the first measurement task or the base station to configure a measurement gap, and performs the first measurement task in the measurement gap after the measurement gap is configured.

In conclusion, the first measurement gap in the foregoing method may be configured for the terminal device for the first measurement task by the device initiating the first measurement task or the base station serving the terminal device.

Optionally, in a scenario in which the first target measurement task is the second measurement task, before the terminal device performs the first target measurement task in the first measurement gap, the method further includes the following steps:

the terminal device sends, for the second measurement task, a first measurement gap configuration request to the device initiating the second measurement task or the base station serving the terminal device;

the terminal device receives first measurement gap configuration information sent by the device initiating the second measurement task or the base station; and the terminal device determines the first measurement gap based on the first measurement gap configuration information.

According to the foregoing method, the terminal device may request the device initiating the second measurement task or the base station to configure a measurement gap for the second measurement task.

Optionally, in S202 in the foregoing embodiment, if the second target measurement task also needs to be performed in a measurement gap, the terminal device may perform the second target measurement task in any one of the following two implementations:

Implementation 1: The terminal device performs the second target measurement task in the first measurement gap. To be specific, when performing the second target measurement task, the terminal device still use the measurement gap used for the first target measurement task.

Implementation 2: The terminal device performs the second target measurement task in a second measurement gap. The second measurement gap is different from the first measurement gap.

Optionally, when the terminal device performs the second target measurement task in Implementation 2, before the terminal device performs the second target measurement task, the method further includes the following:

the terminal device sends, for the second target measurement task, a second measurement gap configuration request to a device initiating the second target measurement task or the base station serving the terminal device;

the terminal device receives second measurement gap configuration information sent by the device initiating the second measurement task or the base station; and the terminal device determines the second measurement gap based on the second measurement gap configuration information.

According to the method, the terminal device can request the device initiating the second target measurement task or the base station to configure a measurement gap for the second target measurement task.

It can be learned from the description of a measurement task that when finishing performing a measurement task, the terminal device needs to generate a measurement report carrying a measurement result, and sends the measurement report to a device initiating the measurement task. Therefore, after sending a measurement request to the terminal device, the initiating device waits to receive a measurement report in a time for receiving the measurement report. When the terminal device refuses to perform the second target measurement task or prolongs execution of the second target measurement task, optionally, the terminal device may instruct the device initiating the second target measurement task to skip receiving a measurement report or prolong a time for receiving a measurement report. In this way, the device initiating the measurement task can be notified of a corresponding execution status of the measurement task, thereby reducing power consumed by the initiating device in waiting to receive the measurement report or in receiving the measurement report. Optionally, the terminal device may instruct the device initiating the second target measurement task to skip receiving the measurement report or prolong the time for receiving the measurement report in the following implementations:

Implementation 1: When the terminal device performs S202 in Manner 1, the method further includes the following:

the terminal device sends a first measurement report reception indication to the device initiating the second target measurement task, where the first measurement report reception indication is used to instruct the device initiating the second target measurement task to skip receiving a measurement report of the second target measurement task.

Implementation 2: When the terminal device performs S202 in Manner 2 or Manner 3, the method further includes the following:

the terminal device sends a second measurement report reception indication to the device initiating the second target measurement task, where the second measurement report reception indication is used to instruct the device initiating the second target measurement task to prolong a time for receiving a measurement report of the second target measurement task.

Implementation 3: When the terminal device performs S202 in Manner 4, the method further includes the following:

the terminal device sends a third measurement report reception indication to a device initiating the first target measurement task, and sending a fourth measurement report reception indication to the device initiating the second target measurement task, where the third measurement report reception indication is used to instruct the device initiating the first target measurement task to prolong a time for receiving a measurement report of the first target measurement task, and the fourth measurement report reception indication is used to instruct the device initiating the second target measurement task to prolong a time for receiving a measurement report of the second target measurement task.

Optionally, in Implementation 3, the third measurement report reception indication further includes the first duration, and/or the fourth measurement report reception indication further includes the second duration.

Therefore, in the foregoing manners, the device initiating the measurement task can learn, based on the received measurement report reception indication, a specific time by which the time for receiving the measurement report needs to be prolonged, thereby reducing power consumed by the initiating device in waiting to receive the measurement report.

Based on the foregoing embodiments, an embodiment of this application further provides a measurement method. The method is applicable but is not applicable to only the mobile communications system shown in FIG. 1. As shown in FIG. 3, a procedure of the method includes the following steps.

S301. An initiating device determines a priority of a measurement task.

Optionally, the initiating device may be the device initiating the first measurement task or the device initiating the second measurement task in the method shown in FIG. 2.

Optionally, the initiating device may determine the priority of the measurement task based on a correspondence between a measurement task and a priority.

S302. The initiating device sends a measurement request for the measurement task to a terminal device, where the measurement request includes the priority of the measurement task.

According to the measurement method provided in this embodiment of this application, the initiating device adds the priority of the measurement task to the measurement request, and then sends the measurement request to the terminal device. In this way, the terminal device can determine the priority of the measurement task based on the measurement request, thereby determining, based on the priority of the measurement task, a measurement task to be preferentially performed.

Figure 4:
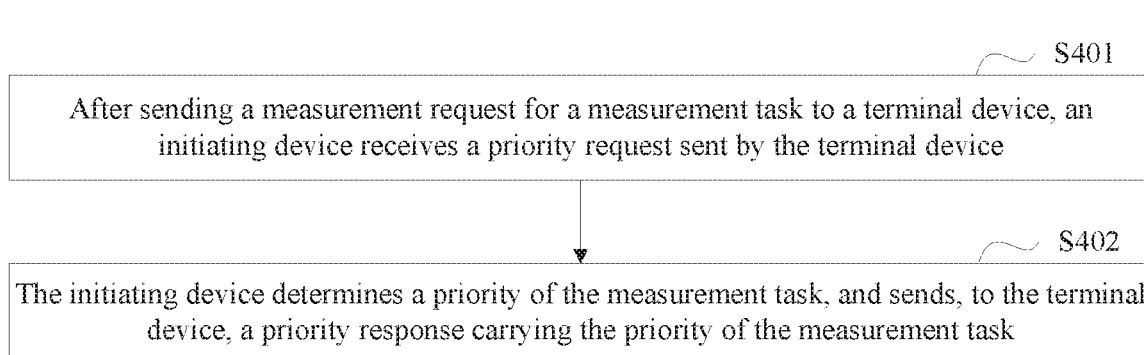
FIG. 4 is a flowchart of a third measurement method according to an embodiment of this application.

Based on the foregoing embodiments, an embodiment of this application further provides a measurement method. The method is applicable but is not applicable to only the mobile communications system shown in FIG. 1. As shown in FIG. 4, a procedure of the method includes the following steps:

S401. After sending a measurement request for a measurement task to a terminal device, an initiating device receives a priority request sent by the terminal device.

S402. The initiating device determines a priority of the measurement task, and sends, to the terminal device, a priority response carrying the priority of the measurement task.

Optionally, the initiating device may determine the priority of the measurement task based on a correspondence between a measurement task and a priority.

According to the measurement method provided in this embodiment of this application, when the terminal device requests, from the initiating device, the priority of the measurement task initiated by the initiating device, the initiating device sends the priority of the measurement task to the terminal device. In this way, the terminal device can determine, based on the priority of the measurement task, a measurement task to be preferentially performed.

Figure 5:
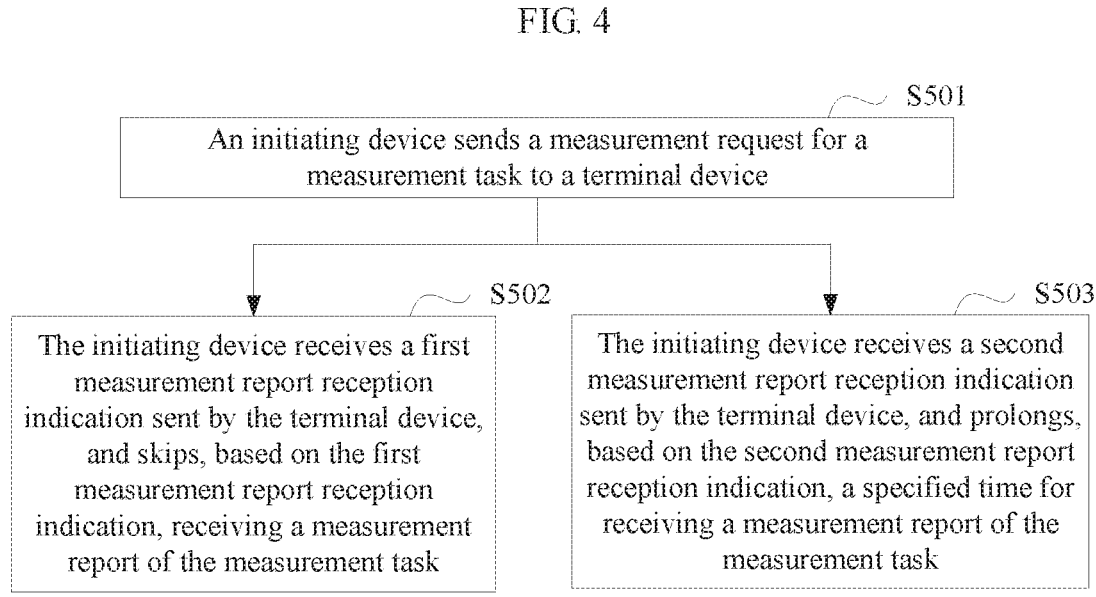
FIG. 5 is a flowchart of a fourth measurement method according to an embodiment of this application.

Based on the foregoing embodiments, an embodiment of this application further provides a measurement method. The method is applicable but is not applicable to only the mobile communications system shown in FIG. 1. As shown in FIG. 5, a procedure of the method includes the following steps.

S501. An initiating device sends a measurement request for a measurement task to a terminal device.

S502. The initiating device receives a first measurement report reception indication sent by the terminal device, and skips, based on the first measurement report reception indication, receiving a measurement report of the measurement task, where the first measurement report reception indication is used to instruct the initiating device to skip receiving the measurement report of the measurement task.

In step S502, the initiating device can learn, based on the first measurement report reception indication, that the terminal device has refused to perform the measurement task and that reception of the measurement report of the measurement task is prohibited, so as to shorten a time in waiting to receive the measurement report and a time in receiving the measurement report.

S503. The initiating device receives a second measurement report reception indication sent by the terminal device, and prolongs, based on the second measurement report reception indication, a specified time for receiving a measurement report of the measurement task, where the second measurement report reception indication is used to instruct the initiating device to prolong the time for receiving the measurement report of the measurement task.

In step S503, the initiating device can learn, based on the second measurement report reception indication, that the terminal device has prolonged an execution time of the measurement task, that is, has prolonged a time in reporting the measurement report of the measurement task. Therefore, the initiating device can correspondingly prolong the specified time for receiving the measurement report of the measurement task, to shorten the time in waiting to receive the measurement report.

Optionally, the second measurement report reception indication further includes duration. In S503, that the initiating device prolongs, based on the second measurement report reception indication, a specified time for receiving a measurement report of the measurement task includes the following:

the initiating device prolongs the specified time for receiving the measurement report of the measurement task by the duration.

In this way, the initiating device can determine specific duration by which the time for receiving the measurement report is to be prolonged, thereby reducing power consumed by the initiating device in waiting to receive the measurement report.

Figure 6:
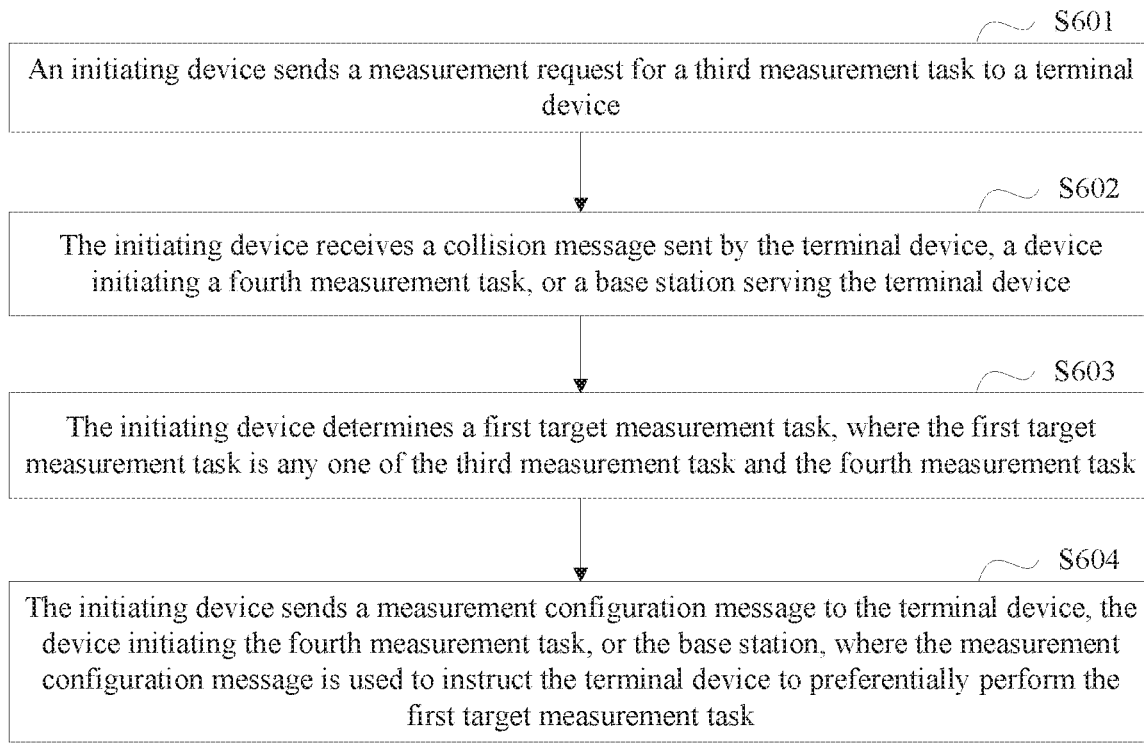
FIG. 6 is a flowchart of a fifth measurement method according to an embodiment of this application.

Based on the foregoing embodiments, an embodiment of this application further provides a measurement method. The method is applicable but is not applicable to only the mobile communications system shown in FIG. 1. As shown in FIG. 6, a procedure of the method includes the following steps.

S601. An initiating device sends a measurement request for a third measurement task to a terminal device.

S602. The initiating device receives a collision message sent by the terminal device, a device initiating a fourth measurement task, or a base station serving the terminal device, where the collision message is used to indicate that the terminal device has received a measurement request for the fourth measurement task.

Optionally, when the collision message is sent by the device initiating the fourth measurement task or the base station, the collision message may be sent by the terminal device to the device initiating the fourth measurement task or the base station, that is, the collision message may be forwarded by the device initiating the fourth measurement task or the base station to the device initiating the third measurement task.

S603. The initiating device determines a first target measurement task, where the first target measurement task is any one of the third measurement task and the fourth measurement task.

Optionally, the initiating device may determine the first target measurement task in the following steps:

the initiating device determines a priority of the third measurement task and a priority of the fourth measurement task; and the initiating device determines a measurement task with a higher priority as the first target measurement task based on the priority of the third measurement task and the priority of the fourth measurement task.

It should be noted that this embodiment of this application imposes no limitation on a manner in which the initiating device determines the first target measurement task. Optionally, the initiating device may determine, according to another policy, a measurement task to be preferentially performed, for example, randomly determine the measurement task to be preferentially performed or determine, based on execution duration, the measurement task to be preferentially performed.

Optionally, in the foregoing step, the initiating device may determine the priority of the third measurement task in but not in only the following two implementations:

Implementation 1: The initiating device determines the stored priority of the third measurement task.

Implementation 2: The initiating device determines the priority that is of the third measurement task and that is included in the collision message.

Optionally, in the foregoing step, the initiating device may determine the priority of the fourth measurement task in but not in only the following two implementations:

Implementation 1: The initiating device determines the stored priority of the fourth measurement task.

Implementation 2: The initiating device determines the priority that is of the fourth measurement task and that is included in the collision message.

S604. The initiating device sends a measurement configuration message to the terminal device, the device initiating the fourth measurement task, or the base station, where the measurement configuration message is used to instruct the terminal device to preferentially perform the first target measurement task.

When the initiating device sends the measurement configuration message to the device initiating the fourth measurement task or the base station, the device initiating the fourth measurement task or the base station forwards the measurement configuration message to the terminal device after receiving the measurement configuration message. In this way, the terminal device can preferentially perform the first target measurement task based on an indication of the measurement configuration message.

According to the method provided in this embodiment of this application, the initiating device can instruct the terminal device to preferentially perform the first target measurement task. Therefore, the terminal device can preferentially perform any one of the two measurement tasks, thereby ensuring completion quality of the measurement task. In this way, when devices initiating two measurement tasks instruct the terminal device to perform the two corresponding measurement tasks, a collision can be avoided in a process of performing the two measurement tasks by the terminal device, thereby ensuring measurement efficiency of the terminal device.

Optionally, in the foregoing embodiment, when the first target measurement task is the third measurement task, the method further includes the following:

the initiating device receives a measurement report of the third measurement task in a specified time for receiving the measurement report of the third measurement task.

Therefore, when the initiating device determines that a measurement task to be preferentially performed is the third measurement task initiated by the initiating device, the initiating device may receive, in an original manner, the measurement report of the third measurement task in the specified time for receiving the measurement report of the third measurement task.

Optionally, in the foregoing embodiment, when the first target measurement task is the fourth measurement task, the method further includes the following:

the initiating device skips receiving a measurement report of the third measurement task; or the initiating device prolongs a specified time for receiving a measurement report of the third measurement task.

In this way, when the initiating device determines that a measurement task to be preferentially performed is not the third measurement task initiated by the initiating device, the initiating device may actively skip receiving the measurement report of the third measurement task or prolong the time for receiving the measurement report of the third measurement task, thereby reducing power consumed by the initiating device in waiting to receive the measurement report or in receiving the measurement report.

Optionally, in the foregoing embodiment, after S604, the method further includes the following:

the initiating device receives a first measurement report reception indication sent by the terminal device, and skips, based on the first measurement report reception indication, receiving a measurement report of the third measurement task, where the first measurement report reception indication is used to instruct the initiating device to skip receiving the measurement report of the third measurement task; or the initiating device receives a second measurement report reception indication sent by the terminal device, and prolongs, based on the second measurement report reception indication, a specified time for receiving a measurement report of the third measurement task, where the second measurement report reception indication is used to instruct the initiating device to prolong the time for receiving the measurement report of the third measurement task.

It can be learned from the description of the embodiment shown in FIG. 5 that, according to the foregoing method, the initiating device can learn an execution status of the third measurement task, and adjust the time for receiving the measurement report of the third measurement task in time or skip receiving the measurement report, thereby reducing power consumed in receiving the measurement report and in waiting to receive the measurement report.

Optionally, in the foregoing step, the second measurement report reception indication further includes duration; and that the initiating device prolongs, based on the second measurement report reception indication, a specified time for receiving a measurement report of the third measurement task includes the following:

the initiating device prolongs the specified time for receiving the measurement report of the third measurement task by the duration.

In this way, the initiating device can determine specific duration by which the time for receiving the measurement report is to be prolonged, thereby reducing power consumed by the initiating device in waiting to receive the measurement report.

Figure 7:
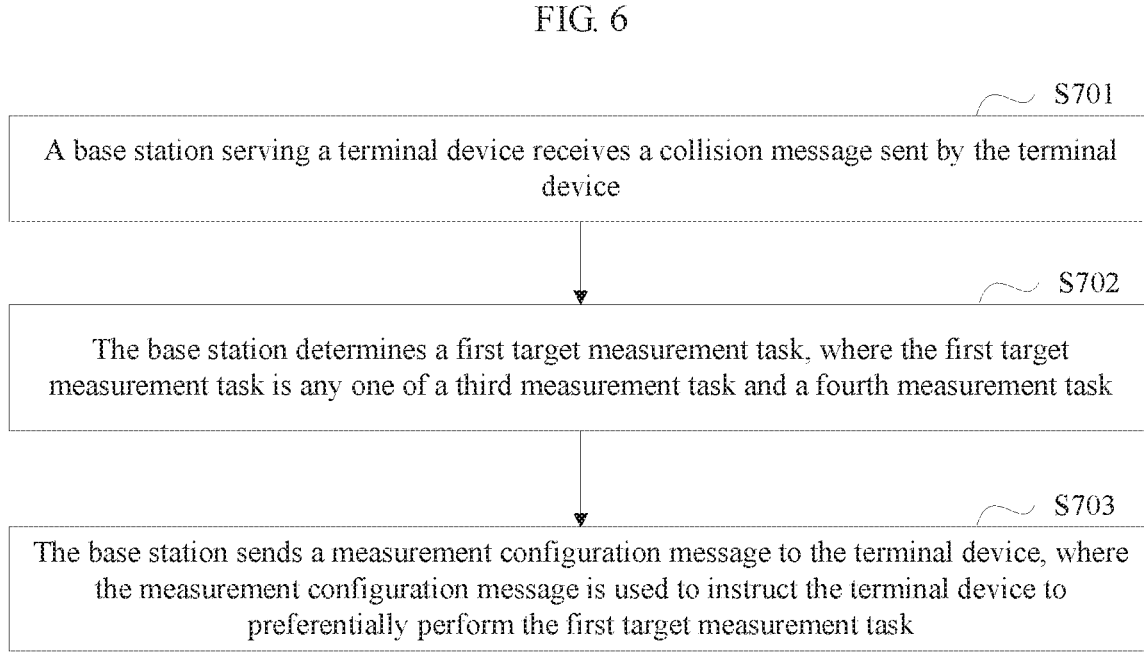
FIG. 7 is a flowchart of a sixth measurement method according to an embodiment of this application.

Based on the foregoing embodiments, an embodiment of this application further provides a measurement method. The method is applicable but is not applicable to only the mobile communications system shown in FIG. 1. As shown in FIG. 7, a procedure of the method includes the following steps.

S701. A base station serving a terminal device receives a collision message sent by the terminal device, where the collision message is used to indicate that the terminal device has received a first measurement request for a first measurement task and a second measurement request for a second measurement task.

S702. The base station determines a first target measurement task, where the first target measurement task is any one of the third measurement task and the fourth measurement task.

Optionally, the base station may perform S702 in the following method:

the base station determines a priority of the first measurement task and a priority of the second measurement task; and the initiating device determines a measurement task with a higher priority as the first target measurement task based on the priority of the first measurement task and the priority of the second measurement task.

In the foregoing method, optionally, the base station may determine the priority of the first measurement task and the priority of the second measurement task in but not in only the following two implementations:

Implementation 1: The base station determines the stored priority of the first measurement task and the stored priority of the second measurement task.

Implementation 2: The base station determines the priority of the first measurement task and the priority of the second measurement task that are included in the collision message.

S703. The base station sends a measurement configuration message to the terminal device, where the measurement configuration message is used to instruct the terminal device to preferentially perform the first target measurement task.

According to the method provided in this embodiment of this application, the base station can instruct the terminal device to preferentially perform the first target measurement task. Therefore, the terminal device can preferentially perform any one of the two measurement tasks, thereby ensuring completion quality of the measurement task. In this way, when devices initiating two measurement tasks instruct the terminal device to perform the two corresponding measurement tasks, a collision can be avoided in a process of performing the two measurement tasks by the terminal device, thereby ensuring measurement efficiency of the terminal device.

Figure 8:
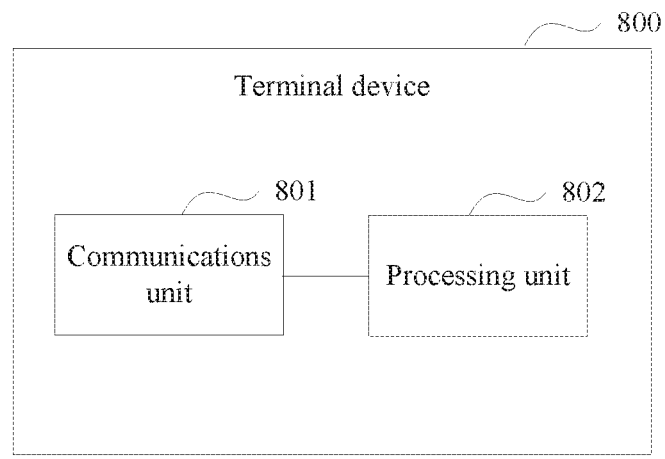
FIG. 8 is a structural diagram of a first terminal device according to an embodiment of this application.

Based on the foregoing embodiments, an embodiment of this application further provides a terminal device 800. The terminal device can be applied to the mobile communications system shown in FIG. 1, and can implement the measurement method in the embodiment shown in FIG. 2. As shown in FIG. 8, the terminal device 800 includes a communications unit 801 and a processing unit 802.

The communications unit 801 is configured to receive a measurement request sent by a device initiating a measurement task.

The processing unit 802 is configured to:

after the communications unit 801 receives a first measurement request sent by a device initiating a first measurement task, when the processing unit 802 does not finish performing the first measurement task, determine that the communications unit 801 receives a second measurement request sent by a device initiating a second measurement task; or determine that the communications unit 801 simultaneously receives the first measurement request and the second measurement request; and preferentially perform a first target measurement task, including:

performing the first target measurement task and refusing to perform a second target measurement task; or first performing the first target measurement task, and then performing the second target measurement task after finishing performing the first target measurement task; or performing the first target measurement task in a specified execution time of the first target measurement task, prolonging a specified execution time of the second target measurement task, and performing the second target measurement task in a time obtained after the execution time of the second target measurement task is prolonged, where an execution time of any measurement task is a consumed time from a moment when the terminal device starts to perform the measurement task to a moment when the terminal device finishes performing the measurement task; or prolonging a specified execution time of the first target measurement task by first duration, prolonging a specified execution time of the second target measurement task by second duration, performing the first target measurement task in a time obtained after the execution time of the first target measurement task is prolonged, and performing the second target measurement task in a time obtained after the execution time of the second target measurement task is prolonged, where the second duration is greater than the first duration; or performing the first target measurement task by using a resource allocated to the first target measurement task, and performing the second target measurement task by using a resource allocated to the second target measurement task, where the resource allocated to the first target measurement task is greater than the resource allocated to the second target measurement task, and the resource includes at least one of the following: a computing resource, a storage resource, a communication resource, and a measurement gap.

The first target measurement task is any one of the first measurement task and the second measurement task, and the second target measurement task is the other one, different from the first target measurement task, of the first measurement task and the second measurement task.

Optionally, the processing unit 802 is further configured to:

determine the first target measurement task before preferentially performing the first target measurement task, including:

when determining that a time at which the first measurement request is received is earlier than a time at which the second measurement request is received, determining, the first measurement task as the first target measurement task; or when determining that a time at which the second measurement request is received is later than a time at which the first measurement request is received, determining, the second measurement task as the first target measurement task; or determining a priority of the first measurement task and a priority of the second measurement task, and determining a measurement task with a higher priority as the first target measurement task based on the priority of the first measurement task and the priority of the second measurement task; or sending, by using the communications unit 801, a first collision message to the device initiating the first measurement task, where the first collision message is used to indicate that the terminal device has received the second measurement request; receiving, by using the communications unit 801, a first measurement configuration message returned by the device initiating the first measurement task, where the first measurement configuration message is used to instruct the terminal device to preferentially perform the first target measurement task; and determining the first target measurement task based on the first measurement configuration message; or sending, by using the communications unit 801, a second collision message to the device initiating the second measurement task, where the second collision message is used to indicate that the terminal device has received the first measurement request; receiving, by using the communications unit 801, a second measurement configuration message returned by the device initiating the second measurement task, where the second measurement configuration message is used to instruct the terminal device to preferentially perform the first target measurement task; and determining the first target measurement task based on the second measurement configuration message; or sending, by using the communications unit 801, a third collision message to a base station serving the terminal device, where the third collision message is used to indicate that the terminal device has received the first measurement request and the second measurement request: receiving, by using the communications unit 801, a third measurement configuration message returned by the base station, where the third measurement configuration message is used to instruct the terminal device to preferentially perform the first target measurement task; and determining the first target measurement task based on the third measurement configuration message.

Optionally, the first collision message further includes the priority of the second measurement task, or the priority of the second measurement task and the priority of the first measurement task; or the second collision message further includes the priority of the first measurement task, or the priority of the first measurement task and the priority of the second measurement task; or the third collision message further includes the priority of the first measurement task and the priority of the second measurement task.

Optionally, when determining the priority of the first measurement task, the processing unit 802 is specifically configured to:

determine the priority that is of the first measurement task and that is included in the first measurement request; or send, by using the communications unit 801, a priority request to the device initiating the first measurement task, and receive, by using the communications unit 801, a priority response that carries the priority of the first measurement task and that is returned by the device initiating the first measurement task; and determine the priority of the first measurement task carried in the priority response.

When determining the priority of the second measurement task, the processing unit 802 is specifically configured to:

determine the priority that is of the second measurement task and that is included in the second measurement request; or send, by using the communications unit 801, a priority request to the device initiating the second measurement task, and receive, by using the communications unit 801, a priority response that carries the priority of the second measurement task and that is returned by the device initiating the second measurement task; and determine the priority of the second measurement task carried in the priority response.

Optionally, when performing the first target measurement task, the processing unit 802 is specifically configured to:

perform the first target measurement task in a first measurement gap.

Optionally, the first measurement gap is configured for the terminal device for the first measurement task by the device initiating the first measurement task or the base station serving the terminal device.

Optionally, when the first target measurement task is the second measurement task, the processing unit 802 is further configured to:

before performing the first target measurement task in the first measurement gap, send, for the second measurement task by using the communications unit 801, a first measurement gap configuration request to the device initiating the second measurement task or the base station serving the terminal device:

receive, by using the communications unit 801, first measurement gap configuration information sent by the device initiating the second measurement task or the base station; and determine the first measurement gap based on the first measurement gap configuration information.

Optionally, when performing the second target measurement task, the processing unit 802 is specifically configured to:

perform the second target measurement task in the first measurement gap; or perform the second target measurement task in a second measurement gap, where the second measurement gap is different from the first measurement gap.

Optionally, the processing unit 802 is further configured to:

before performing the second target measurement task in the second measurement gap, send, for the second target measurement task, a second measurement gap configuration request to a device initiating the second target measurement task or the base station serving the terminal device:

receive, by using the communications unit 801, second measurement gap configuration information sent by the device initiating the second measurement task or the base station; and determine the second measurement gap based on the second measurement gap configuration information.

Optionally, when the processing unit 802 performs the first target measurement task and refuses to perform the second target measurement task, the processing unit 802 is further configured to:

send, by using the communications unit 801, a first measurement report reception indication to the device initiating the second target measurement task, where the first measurement report reception indication is used to instruct the device initiating the second target measurement task to skip receiving a measurement report of the second target measurement task.

Alternatively, when the processing unit 802 performs the first target measurement task, and performs the second target measurement task after finishing performing the first target measurement task, or when the processing unit 802 performs the first target measurement task in the specified execution time of the first target measurement task, prolongs the specified execution time of the second target measurement task, and performs the second target measurement task in the time obtained after the execution time of the second target measurement task is prolonged, the processing unit 802 is further configured to:

send, by using the communications unit 801, a second measurement report reception indication to the device initiating the second target measurement task, where the second measurement report reception indication is used to instruct the device initiating the second target measurement task to prolong a time for receiving a measurement report of the second target measurement task.

Alternatively, when the processing unit 802 prolongs the specified execution time of the first target measurement task by the first duration, prolongs the specified execution time of the second target measurement task by the second duration, performs the first target measurement task in the time obtained after the execution time of the first target measurement task is prolonged, and performs the second target measurement task in the time obtained after the execution time of the second target measurement task is prolonged, the processing unit 802 is further configured to:

send, by using the communications unit 801, a third measurement report reception indication to a device initiating the first target measurement task, and send a fourth measurement report reception indication to the device initiating the second target measurement task, where the third measurement report reception indication is used to instruct the device initiating the first target measurement task to prolong a time for receiving a measurement report of the first target measurement task, and the fourth measurement report reception indication is used to instruct the device initiating the second target measurement task to prolong a time for receiving a measurement report of the second target measurement task.

Optionally, the third measurement report reception indication further includes the first duration, and/or the fourth measurement report reception indication further includes the second duration.

Optionally, the first measurement task and the second measurement task each are any one of a positioning measurement task and a non-positioning measurement task.

This embodiment of this application provides a terminal device. After the terminal device simultaneously or successively receives measurement requests sent by devices initiating two measurement tasks, the terminal device may preferentially perform any one of the two measurement tasks, thereby ensuring completion quality of the measurement task. In this way, when devices initiating two measurement tasks instruct the terminal device to perform the two corresponding measurement tasks, a collision can be avoided in a process of performing the two measurement tasks by the terminal device, thereby ensuring measurement efficiency of the terminal device.

Figure 9:
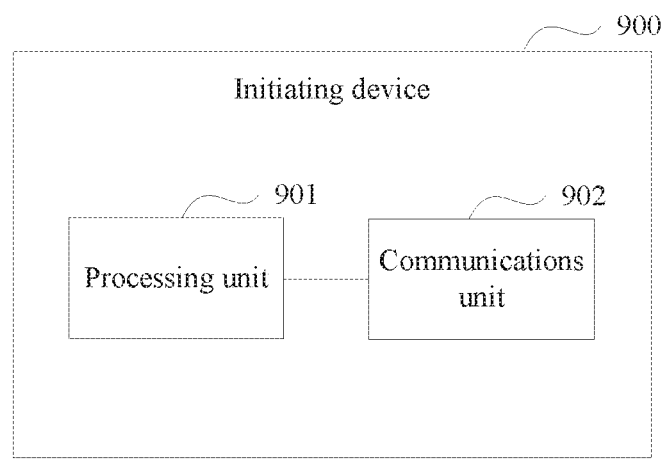
FIG. 9 is a structural diagram of a first initiating device according to an embodiment of this application.

Based on the foregoing embodiments, an embodiment of this application further provides an initiating device. The initiating device can be applied to the mobile communications system shown in FIG. 1, and can implement the measurement method in the embodiment shown in FIG. 3. As shown in FIG. 9, the initiating device 900 includes a processing unit 901 and a communications unit 902.

The processing unit 901 is configured to determine a priority of a measurement task.

The communications unit 902 is configured to send a measurement request for the measurement task to a terminal device, where the measurement request includes the priority of the measurement task.

This embodiment of this application provides an initiating device. The initiating device may add the priority of the measurement task to the measurement request, and then send the measurement request to the terminal device. In this way, the terminal device can determine the priority of the measurement task based on the measurement request, thereby determining, based on the priority of the measurement task, a measurement task to be preferentially performed.

Figure 10:
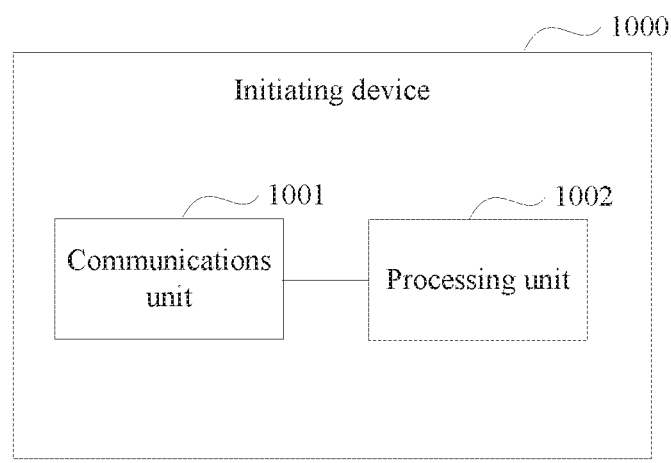
FIG. 10 is a structural diagram of a second initiating device according to an embodiment of this application.

Based on the foregoing embodiments, an embodiment of this application further provides an initiating device. The initiating device can be applied to the mobile communications system shown in FIG. 1, and can implement the measurement method in the embodiment shown in FIG. 4. As shown in FIG. 10, the initiating device 1000 includes a communications unit 1001 and a processing unit 1002.

The communications unit 1001 is configured to: after sending a measurement request for a measurement task to a terminal device, receive a priority request sent by the terminal device.

The processing unit 1002 is configured to determine a priority of the measurement task.

The communications unit 1001 is further configured to send, to the terminal device, a priority response carrying the priority of the measurement task.

This embodiment of this application provides an initiating device. When the terminal device requests, from the initiating device, the priority of the measurement task initiated by the initiating device, the initiating device sends the priority of the measurement task to the terminal device. In this way, the terminal device can determine, based on the priority of the measurement task, a measurement task to be preferentially performed.

Figure 11:
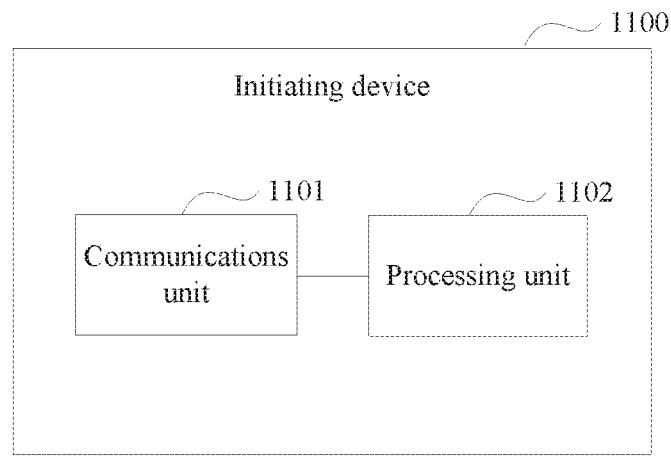
FIG. 11 is a structural diagram of a third initiating device according to an embodiment of this application.

Based on the foregoing embodiments, an embodiment of this application further provides an initiating device. The initiating device can be applied to the mobile communications system shown in FIG. 1, and can implement the measurement method in the embodiment shown in FIG. 5. As shown in FIG. 11, the initiating device 1100 includes a communications unit 1101 and a processing unit 1102.

The communications unit 1101 is configured to: send a measurement request for a measurement task to a terminal device; and receive a first measurement report reception indication sent by the terminal device, or receive a second measurement report reception indication sent by the terminal device, where the first measurement report reception indication is used to instruct the initiating device to skip receiving a measurement report of the measurement task, and the second measurement report reception indication is used to instruct the initiating device to prolong a time for receiving a measurement report of the measurement task.

The processing unit 1102 is configured to skip, based on the first measurement report reception indication, receiving the measurement report of the measurement task, or prolong, based on the second measurement report reception indication, the specified time for receiving the measurement report of the measurement task.

Optionally, the second measurement report reception indication further includes duration; and when prolonging, based on the second measurement report reception indication, the specified time for receiving the measurement report of the measurement task, the processing unit 1102 is specifically configured to:

prolong the specified time for receiving the measurement report of the measurement task by the duration.

This embodiment of this application provides an initiating device. The initiating device can learn an execution status of the measurement task based on the received measurement report reception indication, and adjust the time for receiving the measurement report in time or skip receiving the measurement report, thereby reducing power consumed in receiving the measurement report and in waiting to receive the measurement report.

Figure 12:
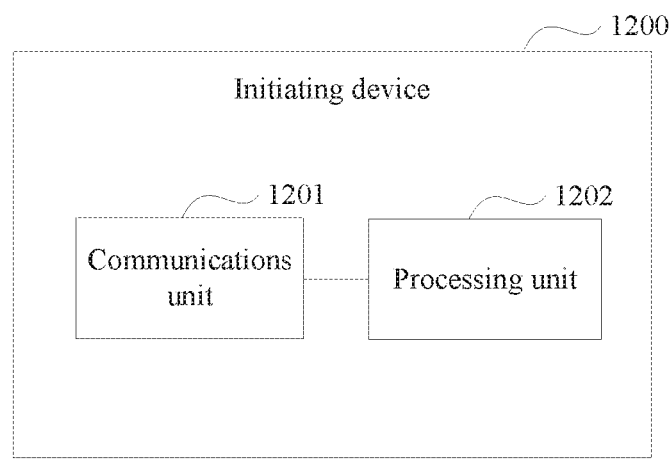
FIG. 12 is a structural diagram of a fourth initiating device according to an embodiment of this application.

Based on the foregoing embodiments, an embodiment of this application further provides an initiating device. The initiating device can be applied to the mobile communications system shown in FIG. 1, and can implement the measurement method in the embodiment shown in FIG. 6. As shown in FIG. 12, the initiating device 1200 includes a communications unit 1201 and a processing unit 1202.

The communications unit 1201 is configured to send a measurement request for a third measurement task to a terminal device; and receive a collision message sent by the terminal device, a device initiating a fourth measurement task, or a base station serving the terminal device, where the collision message is used to indicate that the terminal device has received a measurement request for the fourth measurement task.

The processing unit 1202 is configured to determine a first target measurement task, where the first target measurement task is any one of the third measurement task and the fourth measurement task.

The communications unit 1201 is further configured to send a measurement configuration message to the terminal device, the device initiating the fourth measurement task, or the base station, where the measurement configuration message is used to instruct the terminal device to preferentially perform the first target measurement task.

Optionally, when determining the first target measurement task, the processing unit 1202 is specifically configured to:

determine a priority of the third measurement task and a priority of the fourth measurement task; and determine a measurement task with a higher priority as the first target measurement task based on the priority of the third measurement task and the priority of the fourth measurement task.

Optionally, when determining the priority of the third measurement task, the processing unit 1202 is specifically configured to:

determine the stored priority of the third measurement task; or determine the priority that is of the third measurement task and that is included in the collision message.

When determining the priority of the fourth measurement task, the processing unit 1202 is specifically configured to:

determine the stored priority of the fourth measurement task; or determine the priority that is of the fourth measurement task and that is included in the collision message.

Optionally, when the first target measurement task is the third measurement task, the processing unit 1202 is further configured to:

receive, by using the communications unit 1201, a measurement report of the third measurement task in a specified time for receiving the measurement report of the third measurement task; or when the first target measurement task is the fourth measurement task, the processing unit 1202 is further configured to:

skip receiving a measurement report of the third measurement task; or prolong a specified time for receiving a measurement report of the third measurement task.

Optionally, the communications unit 1201 is further configured to: after sending the measurement configuration message to the terminal device, the device initiating the fourth measurement task, or the base station, receive a first measurement report reception indication sent by the terminal device, where the first measurement report reception indication is used to instruct the initiating device to skip receiving a measurement report of the third measurement task; and the processing unit 1202 is further configured to skip, based on the first measurement report reception indication, receiving the measurement report of the third measurement task; or the communications unit 1201 is further configured to: after sending the measurement configuration message to the terminal device, the device initiating the fourth measurement task, or the base station, receive a second measurement report reception indication sent by the terminal device, where the second measurement report reception indication is used to instruct the initiating device to prolong a time for receiving a measurement report of the third measurement task; and the processing unit 1202 is further configured to prolong, based on the second measurement report reception indication, the specified time for receiving the measurement report of the third measurement task.

Optionally, the second measurement report reception indication further includes duration; and when prolonging, based on the second measurement report reception indication, the specified time for receiving the measurement report of the third measurement task, the processing unit 1202 is specifically configured to:

prolong the specified time for receiving the measurement report of the third measurement task by the duration.

This embodiment of this application provides an initiating device. The initiating device can instruct the terminal device to preferentially perform the first target measurement task. Therefore, the terminal device can preferentially perform any one of the two measurement tasks, thereby ensuring completion quality of the measurement task. In this way, when devices initiating two measurement tasks instruct the terminal device to perform the two corresponding measurement tasks, a collision can be avoided in a process of performing the two measurement tasks by the terminal device, thereby ensuring measurement efficiency of the terminal device.

Figure 13:
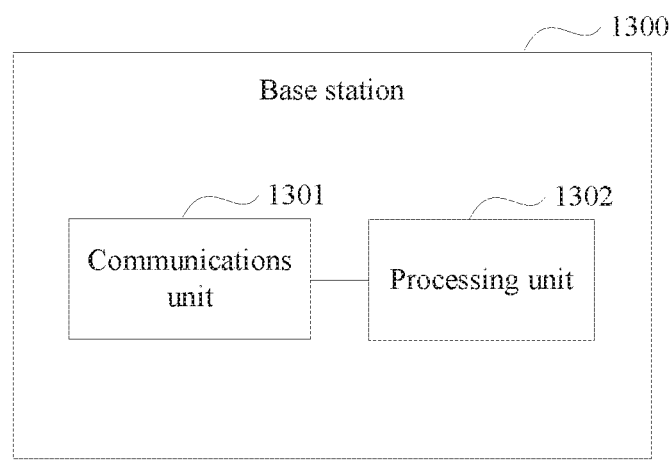
FIG. 13 is a structural diagram of a first base station according to an embodiment of this application.

Based on the foregoing embodiments, an embodiment of this application further provides a base station. The base station can be applied to the mobile communications system shown in FIG. 1, and can implement the measurement method in the embodiment shown in FIG. 7. As shown in FIG. 13, the base station 1300 includes a communications unit 1301 and a processing unit 1302.

The communications unit 1301 is configured to receive a collision message sent by a terminal device, where the collision message is used to indicate that the terminal device has received a first measurement request for a first measurement task and a second measurement request for a second measurement task.

The processing unit 1302 is configured to determine a first target measurement task, where the first target measurement task is any one of the first measurement task and the second measurement task.

The communications unit 1301 is further configured to send a measurement configuration message to the terminal device, where the measurement configuration message is used to instruct the terminal device to preferentially perform the first target measurement task.

Optionally, when determining the first target measurement task, the processing unit 1302 is specifically configured to:

determine a priority of the first measurement task and a priority of the second measurement task; and determine a measurement task with a higher priority as the first target measurement task based on the priority of the first measurement task and the priority of the second measurement task.

Optionally, when determining the priority of the first measurement task and the priority of the second measurement task, the processing unit 1302 is specifically configured to:

determine the stored priority of the first measurement task and the stored priority of the second measurement task; or determine the priority of the first measurement task and the priority of the second measurement task that are included in the collision message.

This embodiment of this application further provides a base station. The base station can instruct the terminal device to preferentially perform the first target measurement task. Therefore, the terminal device can preferentially perform any one of the two measurement tasks, thereby ensuring completion quality of the measurement task. In this way, when devices initiating two measurement tasks instruct the terminal device to perform the two corresponding measurement tasks, a collision can be avoided in a process of performing the two measurement tasks by the terminal device, thereby ensuring measurement efficiency of the terminal device.

It should be noted that unit division is an example in this embodiment of this application, and is merely logical function division. There may be another division manner in actual implementation. Functional units in this embodiment of this application may be integrated into one processing unit, or each of the units may exist alone physically, or two or more units are integrated into one unit. The integrated unit may be implemented in a form of hardware, or may be implemented in a form of a software functional unit.

Based on the foregoing embodiments, an embodiment of this application further provides a computer storage medium. The storage medium stores a software program, and when the software program is read and executed by one or more processors, the measurement methods provided in the foregoing embodiments may be implemented. The computer storage medium may include any medium that can store program code, for example, a USB flash drive, a removable hard disk, a read-only memory (ROM), a random access memory (RAM), a magnetic disk, or an optical disc.

Figure 14:
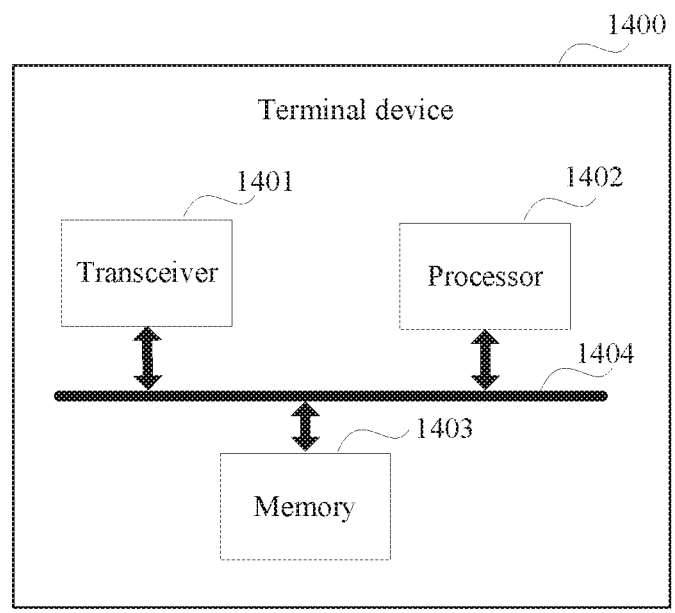
FIG. 14 is a structural diagram of a second terminal device according to an embodiment of this application.

Based on the foregoing embodiments, an embodiment of this application further provides a terminal device. The terminal device is configured to implement the measurement method shown in FIG. 2, and has functions of the terminal device 800 shown in FIG. 8. As shown in FIG. 14, the terminal device 1400 includes a transceiver 1401, a processor 1402, and a memory 1403. The transceiver 1401, the processor 1402, and the memory 1403 are connected to each other.

Optionally, the transceiver 1401, the processor 1402, and the memory 1403 are connected to each other by using a bus 1404. The bus 1404 may be a peripheral component interconnect (PCI) bus, an extended industry standard architecture (EISA) bus, or the like. The bus 1404 may be classified into an address bus, a data bus, a control bus, and the like. For ease of representation, only one thick line is used to represent the bus in FIG. 14, but this does not mean that there is only one bus or only one type of bus.

The transceiver 1401 is configured to receive and send data, to implement communication with another device.

The processor 1402 is configured to implement the measurement method shown in FIG. 2, and is specifically configured to:

after the transceiver 1401 receives a first measurement request sent by a device initiating a first measurement task, when the processor 1402 does not finish performing the first measurement task, determine that the transceiver 1401 has received a second measurement request sent by a device initiating a second measurement task; or determine that the transceiver 1401 has simultaneously received the first measurement request and the second measurement request; and preferentially perform a first target measurement task, including:

performing the first target measurement task and refusing to perform a second target measurement task; or first performing the first target measurement task, and then performing the second target measurement task after finishing performing the first target measurement task; or performing the first target measurement task in a specified execution time of the first target measurement task, prolonging a specified execution time of the second target measurement task, and performing the second target measurement task in a time obtained after the execution time of the second target measurement task is prolonged, where an execution time of any measurement task is a consumed time from a moment when the terminal device 1400 starts to perform the measurement task to a moment when the terminal device 1400 finishes performing the measurement task; or prolonging a specified execution time of the first target measurement task by first duration, prolonging a specified execution time of the second target measurement task by second duration, performing the first target measurement task in a time obtained after the execution time of the first target measurement task is prolonged, and performing the second target measurement task in a time obtained after the execution time of the second target measurement task is prolonged, where the second duration is greater than the first duration; or performing the first target measurement task by using a resource allocated to the first target measurement task, and performing the second target measurement task by using a resource allocated to the second target measurement task, where the resource allocated to the first target measurement task is greater than the resource allocated to the second target measurement task, and the resource includes at least one of the following: a computing resource, a storage resource, a communication resource, and a measurement gap.

The first target measurement task is any one of the first measurement task and the second measurement task, and the second target measurement task is the other one, different from the first target measurement task, of the first measurement task and the second measurement task.

Optionally, the processor 1402 is further configured to:

determine the first target measurement task before preferentially performing the first target measurement task, including:

when determining that a time at which the first measurement request is received is earlier than a time at which the second measurement request is received, determining the first measurement task as the first target measurement task; or when determining that a time at which the second measurement request is received is later than a time at which the first measurement request is received, determining the second measurement task as the first target measurement task; or determining a priority of the first measurement task and a priority of the second measurement task, and determining a measurement task with a higher priority as the first target measurement task based on the priority of the first measurement task and the priority of the second measurement task; or sending, by using the transceiver 1401, a first collision message to the device initiating the first measurement task, where the first collision message is used to indicate that the terminal device 1400 has received the second measurement request; receiving, by using the transceiver 1401, a first measurement configuration message returned by the device initiating the first measurement task, where the first measurement configuration message is used to instruct the terminal device 1400 to preferentially perform the first target measurement task; and determining the first target measurement task based on the first measurement configuration message; or sending, by using the transceiver 1401, a second collision message to the device initiating the second measurement task, where the second collision message is used to indicate that the terminal device 1400 has received the first measurement request; receiving, by using the transceiver 1401, a second measurement configuration message returned by the device initiating the second measurement task, where the second measurement configuration message is used to instruct the terminal device 1400 to preferentially perform the first target measurement task; and determining the first target measurement task based on the second measurement configuration message; or sending, by using the transceiver 1401, a third collision message to a base station serving the terminal device 1400, where the third collision message is used to indicate that the terminal device 1400 has received the first measurement request and the second measurement request; receiving, by using the transceiver 1401, a third measurement configuration message returned by the base station, where the third measurement configuration message is used to instruct the terminal device 1400 to preferentially perform the first target measurement task; and determining the first target measurement task based on the third measurement configuration message.

Optionally, the first collision message further includes the priority of the second measurement task, or the priority of the second measurement task and the priority of the first measurement task; or the second collision message further includes the priority of the first measurement task, or the priority of the first measurement task and the priority of the second measurement task; or the third collision message further includes the priority of the first measurement task and the priority of the second measurement task.

Optionally, when determining the priority of the first measurement task, the processor 1402 is specifically configured to:

determine the priority that is of the first measurement task and that is included in the first measurement request; or send, by using the transceiver 1401, a priority request to the device initiating the first measurement task, and receive a priority response that carries the priority of the first measurement task and that is returned by the device initiating the first measurement task.

When determining the priority of the second measurement task, the processor 1402 is specifically configured to:

determine the priority that is of the second measurement task and that is included in the second measurement request; or send, by using the transceiver 1401, a priority request to the device initiating the second measurement task, and receive a priority response that carries the priority of the second measurement task and that is returned by the device initiating the second measurement task.

Optionally, when performing the first target measurement task, the processor 1402 is specifically configured to:

perform the first target measurement task in a first measurement gap.

Optionally, the first measurement gap is configured for the terminal device 1400 for the first measurement task by the device initiating the first measurement task or the base station serving the terminal device 1400.

Optionally, when the first target measurement task is the second measurement task, the processor 1402 is further configured to:

before performing the first target measurement task in the first measurement gap, send, for the second measurement task by using the transceiver 1401, a first measurement gap configuration request to the device initiating the second measurement task or the base station serving the terminal device 1400;

receive, by using the transceiver 1401, first measurement gap configuration information sent by the device initiating the second measurement task or the base station; and determine the first measurement gap based on the first measurement gap configuration information.

Optionally, that the processor 1402 performs the second target measurement task includes:

performing the second target measurement task in the first measurement gap; or performing the second target measurement task in a second measurement gap, where the second measurement gap is different from the first measurement gap.

Optionally, the processor 1402 is further configured to:

before performing the second target measurement task in the second measurement gap, send, for the second target measurement task by using the transceiver 1401, a second measurement gap configuration request to a device initiating the second target measurement task or the base station serving the terminal device 1400;

receive, by using the transceiver 1401, second measurement gap configuration information sent by the device initiating the second measurement task or the base station; and determine the second measurement gap based on the second measurement gap configuration information.

Optionally, when the processor 1402 performs the first target measurement task and refuses to perform the second target measurement task, the processor 1402 is further configured:

send, by using the transceiver 1401, a first measurement report reception indication to the device initiating the second target measurement task, where the first measurement report reception indication is used to instruct the device initiating the second target measurement task to skip receiving a measurement report of the second target measurement task.

Alternatively, when the processor 1402 performs the first target measurement task, and performs the second target measurement task after finishing performing the first target measurement task, or when the processor 1402 performs the first target measurement task in the specified execution time of the first target measurement task, prolongs the specified execution time of the second target measurement task, and performs the second target measurement task in the time obtained after the execution time of the second target measurement task is prolonged, the processor 1402 is further configured to:

send, by using the transceiver 1401, a second measurement report reception indication to the device initiating the second target measurement task, where the second measurement report reception indication is used to instruct the device initiating the second target measurement task to prolong a time for receiving a measurement report of the second target measurement task.

When the processor 1402 prolongs the specified execution time of the first target measurement task by the first duration, prolongs the specified execution time of the second target measurement task by the second duration, performs the first target measurement task in the time obtained after the execution time of the first target measurement task is prolonged, and performs the second target measurement task in the time obtained after the execution time of the second target measurement task is prolonged, the processor 1402 is further configured to:

send, by using the transceiver 1401, a third measurement report reception indication to a device initiating the first target measurement task, and send a fourth measurement report reception indication to the device initiating the second target measurement task, where the third measurement report reception indication is used to instruct the device initiating the first target measurement task to prolong a time for receiving a measurement report of the first target measurement task, and the fourth measurement report reception indication is used to instruct the device initiating the second target measurement task to prolong a time for receiving a measurement report of the second target measurement task.

Optionally, the third measurement report reception indication further includes the first duration, and/or the fourth measurement report reception indication further includes the second duration.

Optionally, the first measurement task and the second measurement task each are any one of a positioning measurement task and a non-positioning measurement task.

The memory 1403 is configured to store a program instruction and the like. Specifically, the program instruction may include program code, and the program code includes a computer operation instruction. The memory 1403 may include a random access memory (RAM) and may further include a non-volatile memory, for example, at least one magnetic disk memory. The processor 1402 executes the program instruction stored in the memory 1403, to implement the foregoing functions, thereby implementing the measurement method provided in the foregoing embodiment.

This embodiment of this application provides a terminal device. After the terminal device simultaneously or successively receives measurement requests sent by devices initiating two measurement tasks, the terminal device may preferentially perform any one of the two measurement tasks, thereby ensuring completion quality of the measurement task. In this way, when devices initiating two measurement tasks instruct the terminal device to perform the two corresponding measurement tasks, a collision can be avoided in a process of performing the two measurement tasks by the terminal device, thereby ensuring measurement efficiency of the terminal device.

Figure 15:
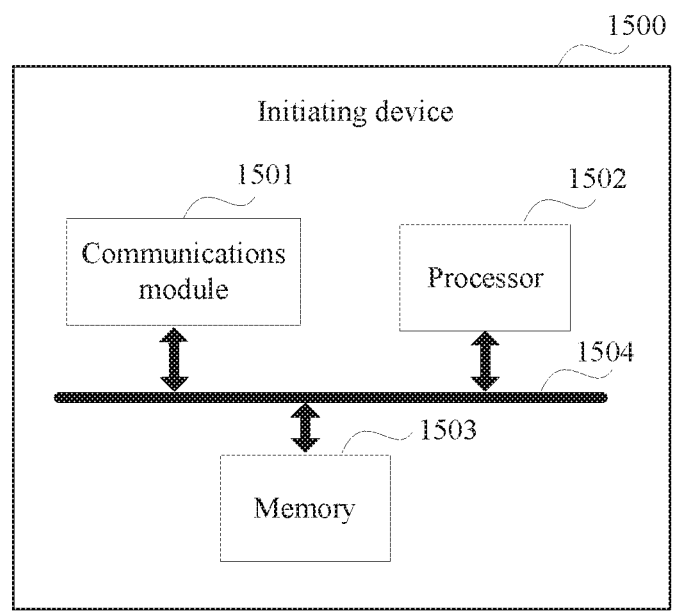
FIG. 15 is a structural diagram of a fifth initiating device according to an embodiment of this application.

Based on the foregoing embodiments, an embodiment of this application further provides an initiating device. The initiating device is configured to implement the measurement method shown in FIG. 3, and has functions of the initiating device 900 shown in FIG. 9. As shown in FIG. 15, the initiating device 1500 includes a communications module 1501, a processor 1502, and a memory 1503. The communications module 1501, the processor 1502, and the memory 1503 are connected to each other.

Optionally, the communications module 1501, the processor 1502, and the memory 1503 are connected to each other by using a bus 1504. The bus 1504 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 15, but this does not mean that there is only one bus or only one type of bus.

The communications module 1501 is configured to receive and send data, to implement communication with another device. Optionally, the communications module 1501 may be a transceiver or a communications interface. For example, when the initiating device is a base station, the communications module 1501 is a transceiver; or when the initiating device is a server, the communications module 1501 is a communications interface.

The processor 1502 is configured to implement the measurement method shown in FIG. 3, and is specifically configured to:

determine a priority of a measurement task; and send a measurement request for the measurement task to a terminal device by using the communications module 1501, where the measurement request includes the priority of the measurement task.

The memory 1503 is configured to store a program instruction and the like. Specifically, the program instruction may include program code, and the program code includes a computer operation instruction. The memory 1503 may include a random access memory (RAM) and may further include a non-volatile memory, for example, at least one magnetic disk memory. The processor 1502 executes the program instruction stored in the memory 1503, to implement the foregoing functions, thereby implementing the measurement method provided in the foregoing embodiment.

This embodiment of this application provides an initiating device. The initiating device may add the priority of the measurement task to the measurement request, and then send the measurement request to the terminal device. In this way, the terminal device can determine the priority of the measurement task based on the measurement request, thereby determining, based on the priority of the measurement task, a measurement task to be preferentially performed.

Figure 16:
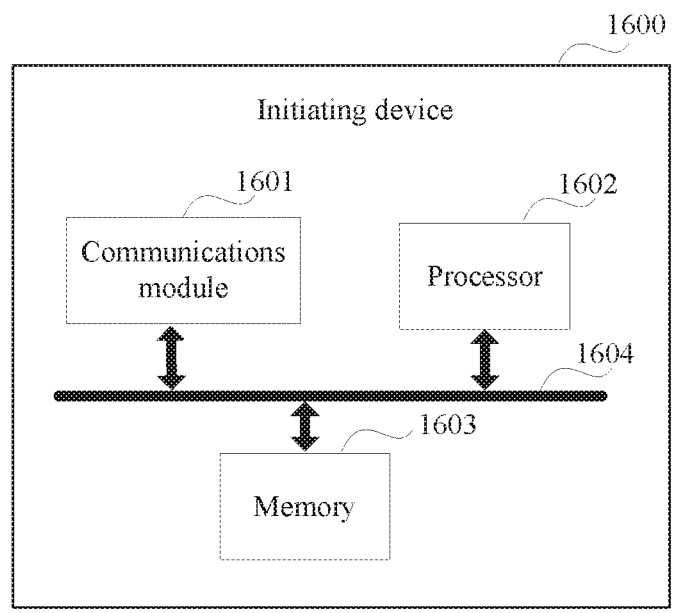
FIG. 16 is a structural diagram of a sixth initiating device according to an embodiment of this application.

Based on the foregoing embodiments, an embodiment of this application further provides an initiating device. The initiating device is configured to implement the measurement method shown in FIG. 4, and has functions of the initiating device 1000 shown in FIG. 10. As shown in FIG. 16, the initiating device 1600 includes a communications module 1601, a processor 1602, and a memory 1603. The communications module 1601, the processor 1602, and the memory 1603 are connected to each other.

Optionally, the communications module 1601, the processor 1602, and the memory 1603 are connected to each other by using a bus 1604. The bus 1604 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 16, but this does not mean that there is only one bus or only one type of bus.

The communications module 1601 is configured to receive and send data, to implement communication with another device. Optionally, the communications module 1601 may be a transceiver or a communications interface. For example, when the initiating device is a base station, the communications module 1601 is a transceiver; or when the initiating device is a server, the communications module 1601 is a communications interface.

The processor 1602 is configured to implement the measurement method shown in FIG. 4, and is specifically configured to:

after sending a measurement request for a measurement task to a terminal device by using the communications module 1061, receive, by using the communications module 1601, a priority request sent by the terminal device; and determine a priority of the measurement task, and send, to the terminal device by using the communications module 1601, a priority response carrying the priority of the measurement task.

The memory 1603 is configured to store a program instruction and the like. Specifically, the program instruction may include program code, and the program code includes a computer operation instruction. The memory 1603 may include a random access memory (RAM) and may further include a non-volatile memory, for example, at least one magnetic disk memory. The processor 1602 executes the program instruction stored in the memory 1603, to implement the foregoing functions, thereby implementing the measurement method provided in the foregoing embodiment.

This embodiment of this application provides an initiating device. When the terminal device requests, from the initiating device, the priority of the measurement task initiated by the initiating device, the initiating device sends the priority of the measurement task to the terminal device. In this way, the terminal device can determine, based on the priority of the measurement task, a measurement task to be preferentially performed.

Figure 17:
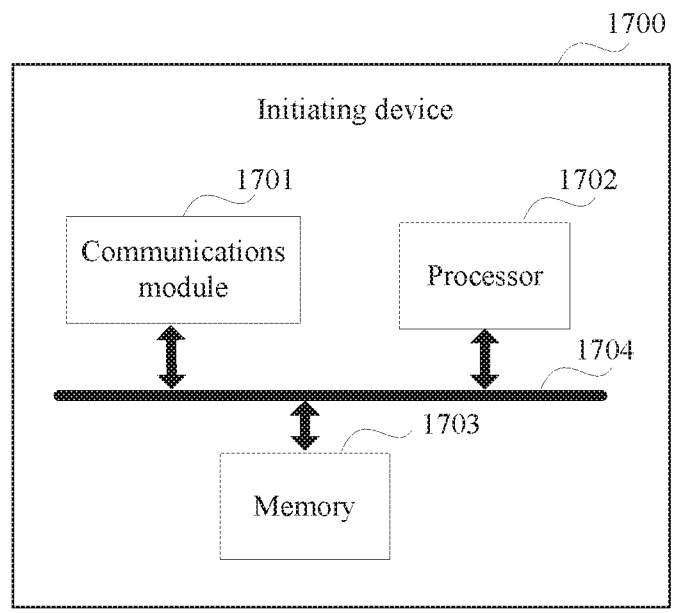
FIG. 17 is a structural diagram of a seventh initiating device according to an embodiment of this application.

Based on the foregoing embodiments, an embodiment of this application further provides an initiating device. The initiating device is configured to implement the measurement method shown in FIG. 5, and has functions of the initiating device 1100 shown in FIG. 11. As shown in FIG. 17, the initiating device 1700 includes a communications module 1701, a processor 1702, and a memory 1703. The communications module 1701, the processor 1702, and the memory 1703 are connected to each other.

Optionally, the communications module 1701, the processor 1702, and the memory 1703 are connected to each other by using a bus 1704. The bus 1704 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 17, but this does not mean that there is only one bus or only one type of bus.

The communications module 1701 is configured to receive and send data, to implement communication with another device. Optionally, the communications module 1701 may be a transceiver or a communications interface. For example, when the initiating device is a base station, the communications module 1701 is a transceiver; or when the initiating device is a server, the communications module 1701 is a communications interface.

The processor 1702 is configured to implement the measurement method shown in FIG. 5, and is specifically configured to:

send a measurement request for a measurement task to a terminal device by using the communications module 1701; and receive, by using the communications module 1701, a first measurement report reception indication sent by the terminal device, and skip, based on the first measurement report reception indication, receiving a measurement report of the measurement task, where the first measurement report reception indication is used to instruct the initiating device to skip receiving the measurement report of the measurement task; or receive, by using the communications module 1701, a second measurement report reception indication sent by the terminal device, and prolong, based on the second measurement report reception indication, a specified time for receiving a measurement report of the measurement task, where the second measurement report reception indication is used to instruct the initiating device to prolong the time for receiving the measurement report of the measurement task.

Optionally, the second measurement report reception indication further includes duration; and when prolonging, based on the second measurement report reception indication, the specified time for receiving the measurement report of the measurement task, the processor 1702 is specifically configured to:

prolong the specified time for receiving the measurement report of the measurement task by the duration.

The memory 1703 is configured to store a program instruction and the like. Specifically, the program instruction may include program code, and the program code includes a computer operation instruction. The memory 1703 may include a random access memory (RAM) and may further include a non-volatile memory, for example, at least one magnetic disk memory. The processor 1702 executes the program instruction stored in the memory 1703, to implement the foregoing functions, thereby implementing the measurement method provided in the foregoing embodiment.

This embodiment of this application provides an initiating device. The initiating device can learn an execution status of the third measurement task based on the received measurement report reception indication, and adjust the time for receiving the measurement report in time or skip receiving the measurement report, thereby reducing power consumed in receiving the measurement report and in waiting to receive the measurement report.

Figure 18:
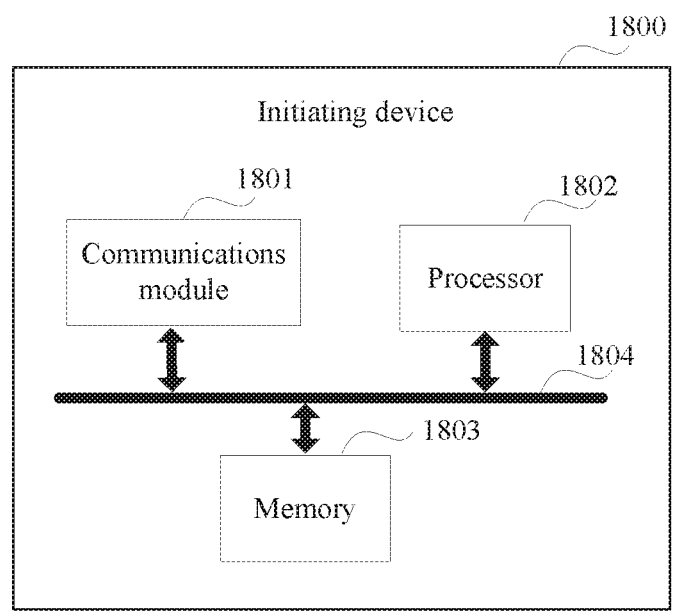
FIG. 18 is a structural diagram of an eighth initiating device according to an embodiment of this application.

Based on the foregoing embodiments, an embodiment of this application further provides an initiating device. The initiating device is configured to implement the measurement method shown in FIG. 6, and has functions of the initiating device 1200 shown in FIG. 12. As shown in FIG. 18, the initiating device 1800 includes a communications module 1801, a processor 1802, and a memory 1803. The communications module 1801, the processor 1802, and the memory 1803 are connected to each other.

Optionally, the communications module 1801, the processor 1802, and the memory 1803 are connected to each other by using a bus 1804. The bus 1804 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 18, but this does not mean that there is only one bus or only one type of bus.

The communications module 1801 is configured to receive and send data, to implement communication with another device. Optionally, the communications module 1801 may be a transceiver or a communications interface. For example, when the initiating device is a base station, the communications module 1801 is a transceiver; or when the initiating device is a server, the communications module 1801 is a communications interface.

The processor 1802 is configured to implement the measurement method shown in FIG. 6, and is specifically configured to:

send a measurement request for a third measurement task to a terminal device by using the communications module 1801;

receive, by using the communications module 1801, a collision message sent by the terminal device, a device initiating a fourth measurement task, or a base station serving the terminal device, where the collision message is used to indicate that the terminal device has received a measurement request for the fourth measurement task;

determine a first target measurement task, where the first target measurement task is any one of the third measurement task and the fourth measurement task; and send a measurement configuration message to the terminal device, the device initiating the fourth measurement task, or the base station by using the communications module 1801, where the measurement configuration message is used to instruct the terminal device to preferentially perform the first target measurement task.

Optionally, when determining the first target measurement task, the processor 1802 is specifically configured to:

determine a priority of the third measurement task and a priority of the fourth measurement task; and determine a measurement task with a higher priority as the first target measurement task based on the priority of the third measurement task and the priority of the fourth measurement task.

Optionally, when determining the priority of the third measurement task, the processor 1802 is specifically configured to:

determine the stored priority of the third measurement task; or determine the priority that is of the third measurement task and that is included in the collision message.

When determining the priority of the fourth measurement task, the processor 1802 is specifically configured to:

determine the stored priority of the fourth measurement task; or determine the priority that is of the fourth measurement task and that is included in the collision message.

Optionally, when the first target measurement task is the third measurement task, the processor 1802 is further configured to:

receive, by using the communications module 1801, a measurement report of the third measurement task in a specified time for receiving the measurement report of the third measurement task; or when the first target measurement task is the fourth measurement task, the processor 1802 is further configured to:

skip receiving a measurement report of the third measurement task; or prolong a specified time for receiving a measurement report of the third measurement task.

Optionally, the processor 1802 is further configured to:

after sending the measurement configuration message to the terminal device, the device initiating the fourth measurement task, or the base station, receive, by using the communications module 1801, a first measurement report reception indication sent by the terminal device, and skip, based on the first measurement report reception indication, receiving a measurement report of the third measurement task, where the first measurement report reception indication is used to instruct the initiating device to skip receiving the measurement report of the third measurement task; or after sending the measurement configuration message to the terminal device, the device initiating the fourth measurement task, or the base station, receive, by using the communications module 1801, a second measurement report reception indication sent by the terminal device, and prolong, based on the second measurement report reception indication, a specified time for receiving a measurement report of the third measurement task, where the second measurement report reception indication is used to instruct the initiating device to prolong the time for receiving the measurement report of the third measurement task.

Optionally, the second measurement report reception indication further includes duration; and when prolonging, based on the second measurement report reception indication, the specified time for receiving the measurement report of the third measurement task, the processor 1802 is specifically configured to:

prolong the specified time for receiving the measurement report of the third measurement task by the duration.

The memory 1803 is configured to store a program instruction and the like. Specifically, the program instruction may include program code, and the program code includes a computer operation instruction. The memory 1803 may include a random access memory (RAM) and may further include a non-volatile memory, for example, at least one magnetic disk memory. The processor 1802 executes the program instruction stored in the memory 1803, to implement the foregoing functions, thereby implementing the measurement method provided in the foregoing embodiment.

This embodiment of this application provides an initiating device. The initiating device can instruct the terminal device to preferentially perform the first target measurement task. Therefore, the terminal device can preferentially perform any one of the two measurement tasks, thereby ensuring completion quality of the measurement task. In this way, when devices initiating two measurement tasks instruct the terminal device to perform the two corresponding measurement tasks, a collision can be avoided in a process of performing the two measurement tasks by the terminal device, thereby ensuring measurement efficiency of the terminal device.

Figure 19:
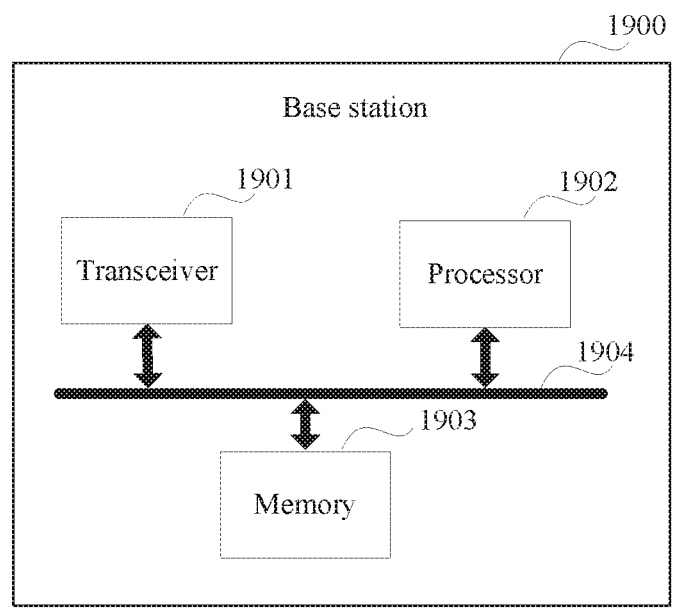
FIG. 19 is a structural diagram of a second base station according to an embodiment of this application.

Based on the foregoing embodiments, an embodiment of this application further provides a base station. The base station is configured to implement the measurement method shown in FIG. 7, and has functions of the base station 1300 shown in FIG. 13. As shown in FIG. 19, the base station 1900 includes a transceiver 1901, a processor 1902, and a memory 1903. The transceiver 1901, the processor 1902, and the memory 1903 are connected to each other.

Optionally, the transceiver 1901, the processor 1902, and the memory 1903 are connected to each other by using a bus 1904. The bus 1904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 19, but this does not mean that there is only one bus or only one type of bus.

The transceiver 1901 is configured to receive and send data, to implement communication with another device.

The processor 1902 is configured to implement the measurement method shown in FIG. 7, and is specifically configured to:

receive, by using the transceiver 1901, a collision message sent by a terminal device, where the collision message is used to indicate that the terminal device has received a first measurement request for a first measurement task and a second measurement request for a second measurement task;

determine a first target measurement task, where the first target measurement task is any one of the first measurement task and the second measurement task; and send a measurement configuration message to the terminal device by using the transceiver 1901, where the measurement configuration message is used to instruct the terminal device to preferentially perform the first target measurement task.

Optionally, when determining the first target measurement task, the processor 1902 is specifically configured to:

determine a priority of the first measurement task and a priority of the second measurement task; and determine a measurement task with a higher priority as the first target measurement task based on the priority of the first measurement task and the priority of the second measurement task.

Optionally, when determining the priority of the first measurement task and the priority of the second measurement task, the processor 1902 is specifically configured to:

determine the stored priority of the first measurement task and the stored priority of the second measurement task; or determine the priority of the first measurement task and the priority of the second measurement task that are included in the collision message.

The memory 1903 is configured to store a program instruction and the like. Specifically, the program instruction may include program code, and the program code includes a computer operation instruction. The memory 1903 may include a random access memory (RAM) and may further include a non-volatile memory, for example, at least one magnetic disk memory. The processor 1902 executes the program instruction stored in the memory 1903, to implement the foregoing functions, thereby implementing the measurement method provided in the foregoing embodiment.

This embodiment of this application further provides a base station. The base station can instruct the terminal device to preferentially perform the first target measurement task. Therefore, the terminal device can preferentially perform any one of the two measurement tasks, thereby ensuring completion quality of the measurement task. In this way, % when devices initiating two measurement tasks instruct the terminal device to perform the two corresponding measurement tasks, a collision can be avoided in a process of performing the two measurement tasks by the terminal device, thereby ensuring measurement efficiency of the terminal device.

In conclusion, the embodiments of this application provide a measurement method and a device. In this method, after the terminal device simultaneously or successively receives measurement requests sent by devices initiating two measurement tasks, the terminal device may preferentially perform any one of the two measurement tasks, thereby ensuring completion quality of the measurement task. In this way, when devices initiating two measurement tasks instruct the terminal device to perform the two corresponding measurement tasks, a collision can be avoided in a process of performing the two measurement tasks by the terminal device, thereby ensuring measurement efficiency of the terminal device.

A person skilled in the art should understand that the embodiments of this application may be provided as a method, a system, or a computer program product. Therefore, this application may use a form of hardware only embodiments, software only embodiments, or embodiments with a combination of software and hardware. Furthermore, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided to a general purpose computer, a dedicated purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art may make various modifications and variations to the embodiments of this application without departing from the scope of the embodiments of this application. Therefore, this application is intended to cover these modifications and variations provided that they fall in the scope of protection defined by the following claims and their equivalent technologies.

What is claimed is:

1. A measurement method, comprising:
after receiving, by a terminal device, a first measurement request from a device initiating a first measurement task, and before the first measurement task ends, receiving, by the terminal device, a second measurement request from a device initiating a second measurement task, wherein the first measurement request comprises a first priority of the first measurement task, and the second measurement request comprises a second priority of the second measurement task;
determining, by the terminal device, the first priority of the first measurement task and the second priority of the second measurement task according to the first measurement request and the second measurement request, respectively; and
performing, by the terminal device based on the first priority of the first measurement task and the second priority of the second measurement task, the first measurement task in a first measurement gap, and skipping performing the second measurement task;
wherein the first measurement task is a positioning measurement task and the second measurement task is a non-positioning measurement task.

2. The method according to claim 1, wherein the first measurement task is a measurement of reference signal arrival time difference (RSTD).

3. The method according to claim 1, wherein the first measurement gap is configured for the terminal device to perform the first measurement task.

4. The method according to 1, wherein before performing, by the terminal device, the first measurement task in the first measurement gap, the method further comprises:
requiring, by the terminal device, the device initiating the first measurement task to configure the first measurement gap.

5. The method according to claim 1, wherein before performing, by the terminal device, the first measurement task in the first measurement gap, and skipping performing the second measurement task, the method further comprises:
sending, by the terminal device, a first collision message to the device initiating the first measurement task, wherein the first collision message indicates that the terminal device has received the second measurement request and the first collision message further comprises the second priority of the second measurement task;
receiving, by the terminal device, a first measurement configuration message from the device initiating the first measurement task, wherein the first measurement configuration message instructs the terminal device to perform the first measurement task in a first measurement gap and skip performing the second measurement task; and
determining, by the terminal device, a first target measurement task based on the first measurement configuration message.

6. The method according to claim 1, wherein before performing, by the terminal device, the first measurement task in the first measurement gap, and skipping performing the second measurement task, the method further comprises:
determining, by the terminal device, a measurement task with a higher priority as a first target measurement task based on the first priority of the first measurement task and the second priority of the second measurement task.

7. A terminal device, comprising:
a transceiver configured to:
after receiving a first measurement request from a device initiating a first measurement task, and before the first measurement task ends, receive a second measurement request from a device initiating a second measurement task, wherein the first measurement request comprises a first priority of the first measurement task, and the second measurement request comprises a second priority of the second measurement task;
a non-transitory memory storage comprising instructions; and
one or more hardware processors in communication with the non-transitory memory storage, wherein the one or more hardware processors execute the instructions to:
determine the first priority of the first measurement task and the second priority of the second measurement task according to the first measurement request and the second measurement request, respectively; and
perform, based on the first priority of the first measurement task and the second priority of the second measurement task, the first measurement task in a first measurement gap, and skip performing the second measurement task;
wherein the first measurement task is a positioning measurement task and the second measurement task is a non-positioning measurement task.

8. The terminal device according to claim 7, wherein the first measurement task is a measurement of reference signal arrival time difference (RSTD).

9. The terminal device according to claim 7, wherein the first measurement gap is configured for the terminal device to perform the first measurement task.

10. The terminal device according to 7, wherein before perform the first measurement task in the first measurement gap, and skip performing the second measurement task, the one or more hardware processors execute the instructions to:
require the device initiating the first measurement task to configure the first measurement gap.

11. The terminal device according to claim 7, wherein before perform the first measurement task in the first measurement gap, and skip performing the second measurement task, the one or more hardware processors execute the instructions to:
send a first collision message to the device initiating the first measurement task, wherein the first collision message indicates that the terminal device has received the second measurement request and the first collision message further comprises the second priority of the second measurement task;
receive a first measurement configuration message from the device initiating the first measurement task, wherein the first measurement configuration message instructs the terminal device to perform the first measurement task in a first measurement gap and skip performing the second measurement task; and
determine a first target measurement task based on the first measurement configuration message.

12. The terminal device according to claim 7, wherein before perform the first measurement task in the first measurement gap, and skip performing the second measurement task, the one or more hardware processors execute the instructions to:

determine a measurement task with a higher priority as a first target measurement task based on the first priority of the first measurement task and the second priority of the second measurement task.

13. A non-transitory storage medium, wherein the non-transitory storage medium stores program instructions for execution by at least one processor to perform:
- after receiving a first measurement request from a device initiating a first measurement task, and before the first measurement task ends, receiving, by the terminal device, a second measurement request from a device initiating a second measurement task, wherein the first measurement request comprises a first priority of the first measurement task, and the second measurement request comprises a second priority of the second measurement task;
- determining, by the terminal device, the first priority of the first measurement task and the second priority of the second measurement task according to the first measurement request and the second measurement request, respectively; and
- performing, based on the first priority of the first measurement task and the second priority of the second measurement task, the first measurement task in a first measurement gap, and skipping performing the second measurement task;
- wherein the first measurement task is a positioning measurement task and the second measurement task is a non-positioning measurement task.

14. The non-transitory storage medium according to claim 13, wherein the first measurement task is a measurement of reference signal arrival time difference (RSTD).

15. The non-transitory storage medium according to claim 13, wherein the first measurement gap is configured for the terminal device to perform the first measurement task.

16. The non-transitory storage medium according to claim 13, wherein before performing the first measurement task in the first measurement gap, the non-transitory storage medium stores the program instructions for execution by the at least one processor to perform:
- requiring the device initiating the first measurement task to configure the first measurement gap.

17. The non-transitory storage medium according to claim 13, wherein before performing the first measurement task in the first measurement gap, and skipping performing the second measurement task, the non-transitory storage medium stores the program instructions for execution by the at least one processor to perform:
- sending a first collision message to the first device initiating the first measurement task, wherein the first collision message indicates that the terminal device has received the second measurement request and the first collision message further comprises the second priority of the second measurement task;
- receiving a first measurement configuration message from the device initiating the first measurement task, wherein the first measurement configuration message instructs the terminal device to perform the first measurement task in a first measurement gap and skip performing the second measurement task; and
- determining a first target measurement task based on the first measurement configuration message.

18. The non-transitory storage medium according to claim 13, wherein before performing the first measurement task in the first measurement gap, and skipping performing the second measurement task, the non-transitory storage medium stores the program instructions for execution by the at least one processor to perform:
- determining a measurement task with a higher priority as a first target measurement task based on the first priority of the first measurement task and the second priority of the second measurement task.

* * * * *

UNITED STATES PATENT AND TRADEMARK OFFICE
CERTIFICATE OF CORRECTION

PATENT NO. : 11,445,395 B2  
APPLICATION NO. : 16/674852  
DATED : September 13, 2022  
INVENTOR(S) : Jiantao Xue and Jing Han Page 1 of 1

It is certified that error appears in the above-identified patent and that said Letters Patent is hereby corrected as shown below:

In the Claims

In Column 50, In Line 38, Claim 10, delete "to" and insert -- to claim --.

In Column 52, In Line 12, Claim 17, delete "first device" and insert -- device --.

Signed and Sealed this  
Twenty-fifth Day of April, 2023

Katherine Kelly Vidal  
*Director of the United States Patent and Trademark Office*